(12) United States Patent
Tisue

(10) Patent No.: US 8,007,041 B2
(45) Date of Patent: Aug. 30, 2011

(54) LIGHTWEIGHT THREE-LINK CYCLE SEAT CLAMP

(76) Inventor: Kevin Tisue, Phoenix, AZ (US)

(*) Notice: Subject to any disclaimer, the term of this patent is extended or adjusted under 35 U.S.C. 154(b) by 0 days.

(21) Appl. No.: 12/562,311

(22) Filed: Sep. 18, 2009

(65) Prior Publication Data

US 2010/0007182 A1    Jan. 14, 2010

Related U.S. Application Data

(63) Continuation of application No. 10/812,217, filed on Mar. 29, 2004, now abandoned.

(51) Int. Cl.
*B60N 2/38* (2006.01)

(52) U.S. Cl. .......... 297/195.1; 297/195.11; 297/215.13; 297/215.15

(58) Field of Classification Search .......... 297/195.1, 297/195.11, 215.11, 215.15, 313, 325–327, 297/334
See application file for complete search history.

(56) References Cited

U.S. PATENT DOCUMENTS

| | | | | |
|---|---|---|---|---|
| 3,658,380 A | * | 4/1972 | Townsend | 297/211 |
| 3,712,666 A | * | 1/1973 | Stoll | 297/61 |
| 4,979,726 A | * | 12/1990 | Geraci | 297/313 |
| 5,447,358 A | * | 9/1995 | Corlett | 297/344.18 |
| 5,489,139 A | * | 2/1996 | McFarland | 297/195.1 |
| 5,915,675 A | * | 6/1999 | Chen | 267/132 |
| 5,915,784 A | * | 6/1999 | Clark | 297/215.15 |
| 6,270,065 B1 | * | 8/2001 | Hals | 267/132 |
| 6,409,130 B1 | * | 6/2002 | Maret | 248/219.2 |
| 6,527,341 B1 | * | 3/2003 | Martin | 297/332 |
| 6,811,218 B2 | * | 11/2004 | Deimen et al. | 297/284.1 |
| 7,293,827 B2 | * | 11/2007 | Schrader | 297/195.11 |
| 2003/0151288 A1 | * | 8/2003 | Deisig | 297/313 |

* cited by examiner

*Primary Examiner* — David Dunn
*Assistant Examiner* — Erika Garrett
(74) *Attorney, Agent, or Firm* — Parsons & Goltry; Robert A. Parsons; Michael W. Goltry

(57) ABSTRACT

A lightweight, adjustable seat clamping assembly for attaching a seat to a bicycle or like cycle comprised of three links assembled together to create three parallel pivotal axes that form a triangular pattern. One link contains the seat post. Another link contains the seat. The third link provides support between the first two. With respect to the seat post, angular position and horizontal clamping offset are adjusted by altering the positions of the three pivotal axes. Horizontal seat position is adjusted by shifting the seat horizontally within the assembly. The assembly can incorporate a calibration scale that assists the rider in determining and remembering the seat's angular position.

15 Claims, 24 Drawing Sheets

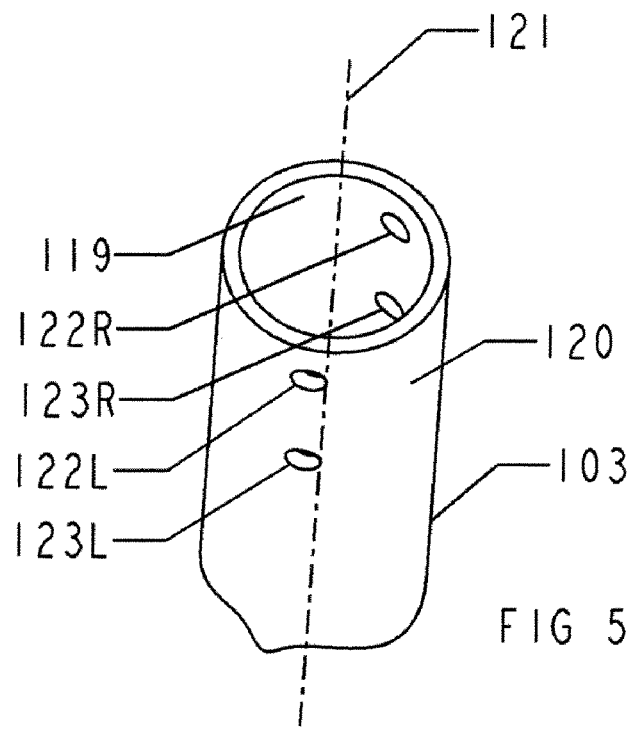
FIG 5
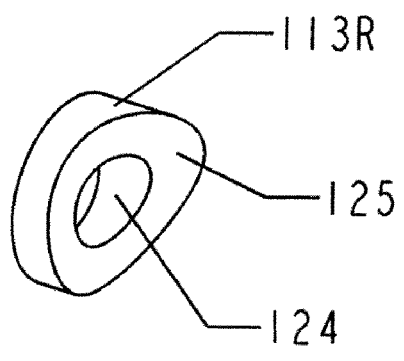
FIG 6-A
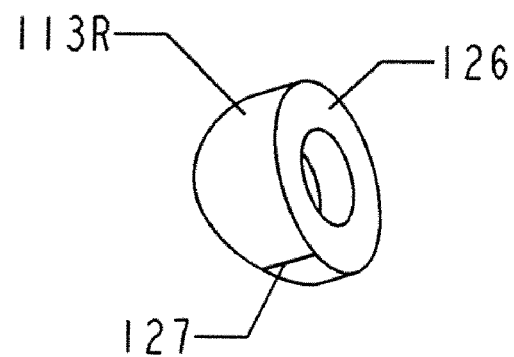
FIG 6-B

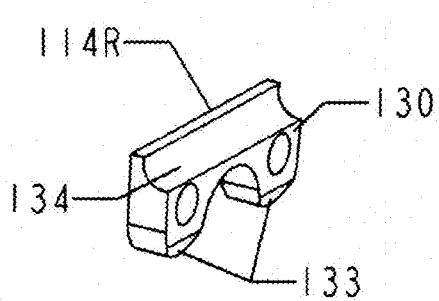
FIG 7-A
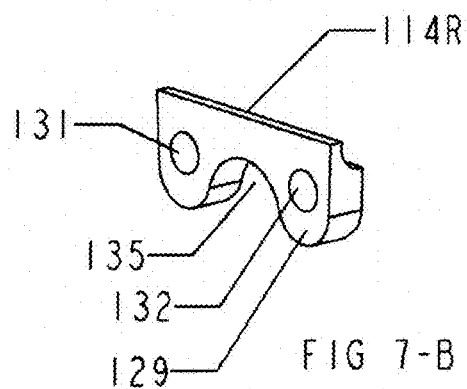
FIG 7-B
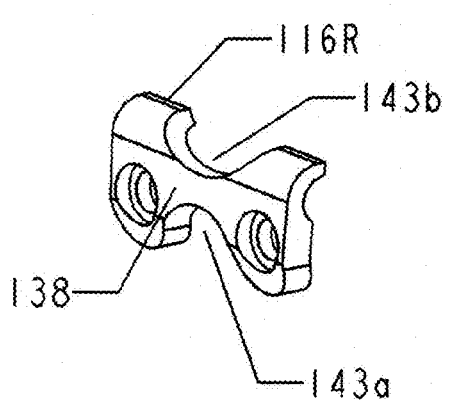
FIG 8-A
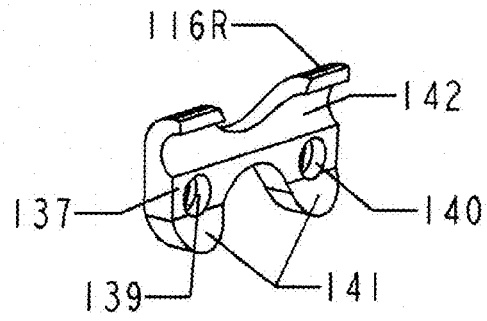
FIG 8-B
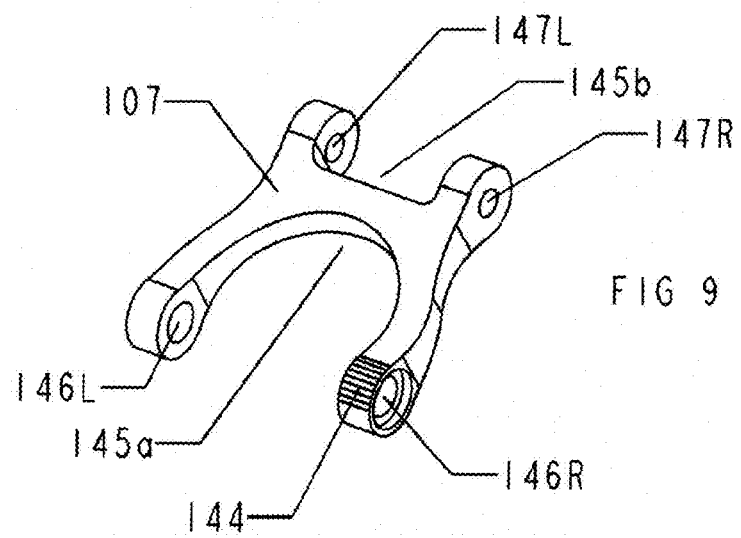
FIG 9

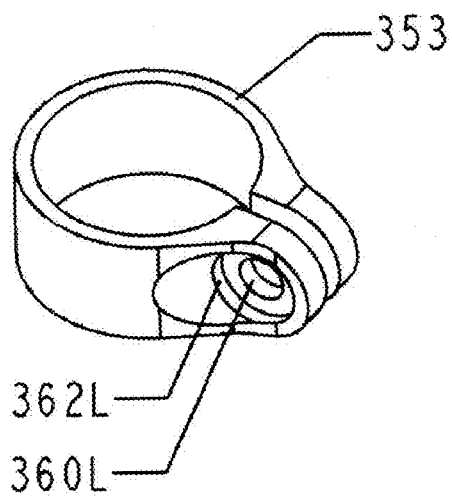
FIG 18-A
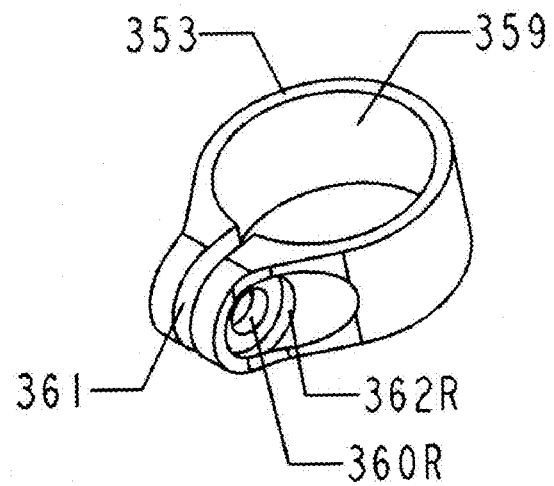
FIG 18-B
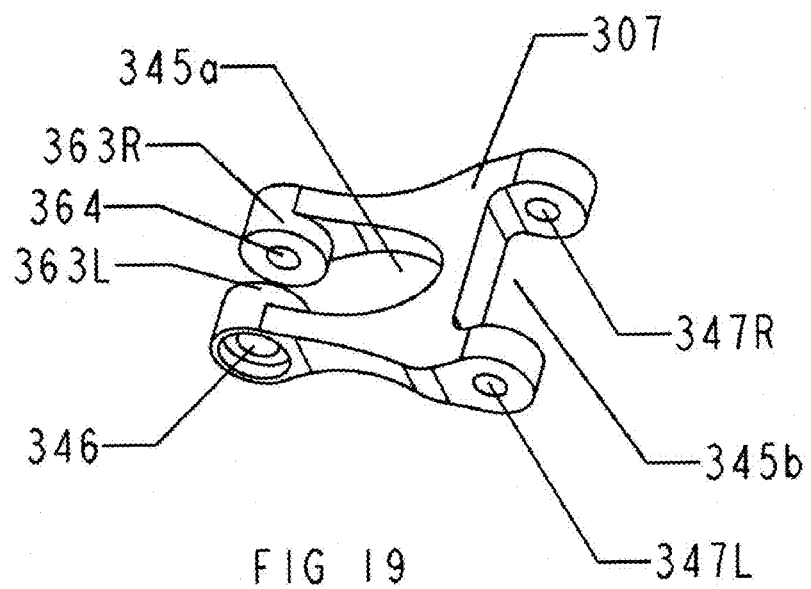
FIG 19

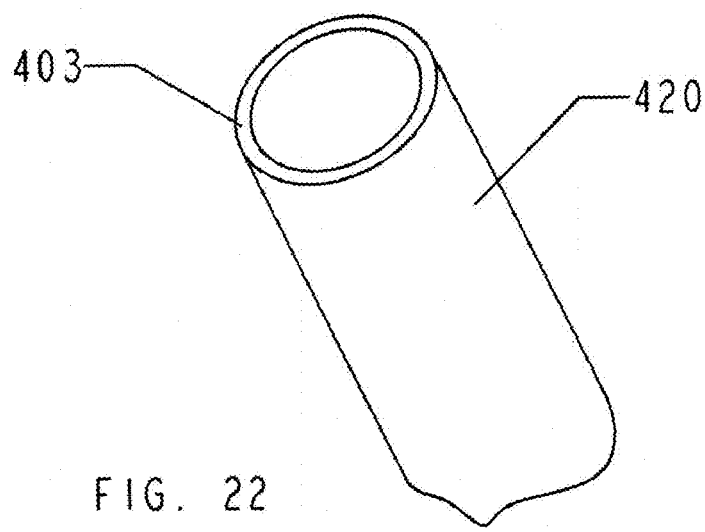
FIG. 22
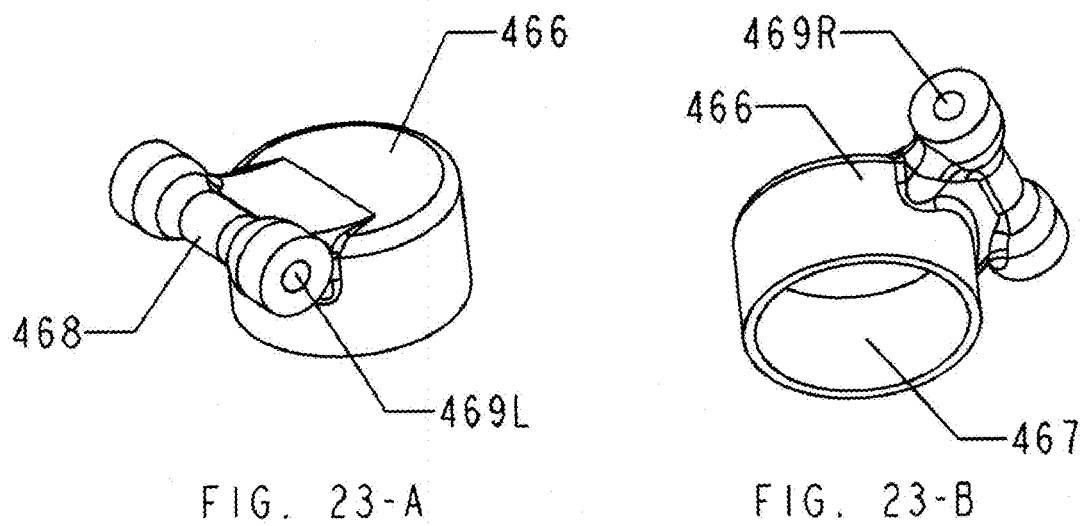
FIG. 23-A  FIG. 23-B

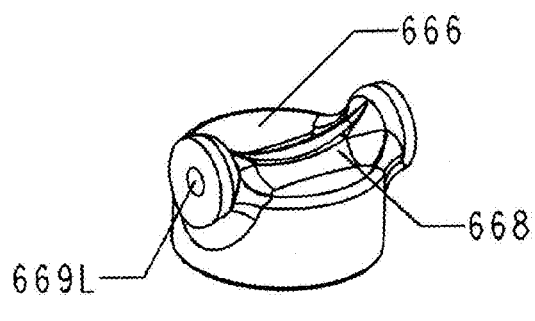
FIG. 32-A
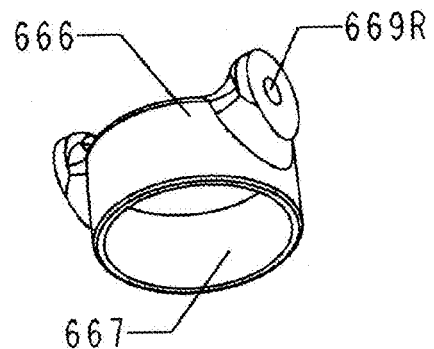
FIG. 32-B
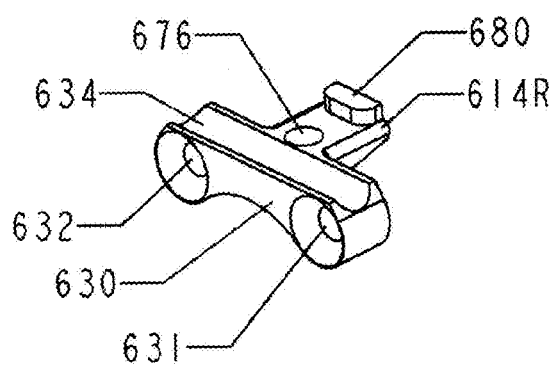
FIG. 33-A
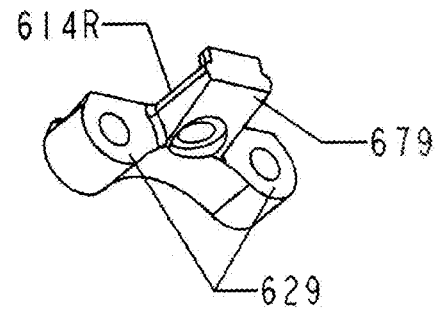
FIG. 33-B

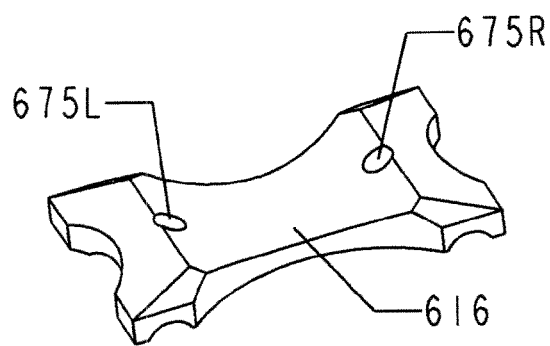
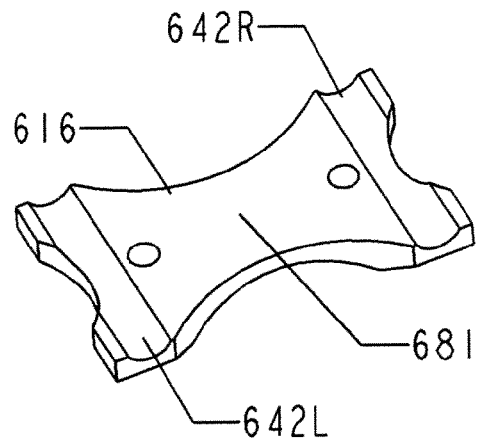
FIG. 34-A  FIG. 34-B
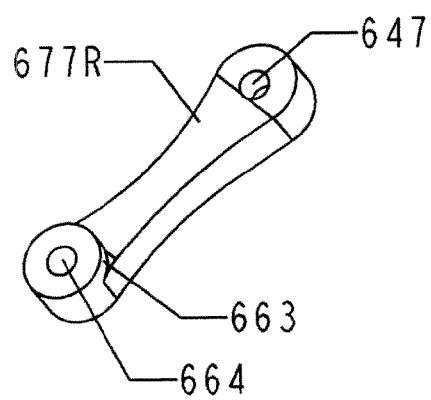
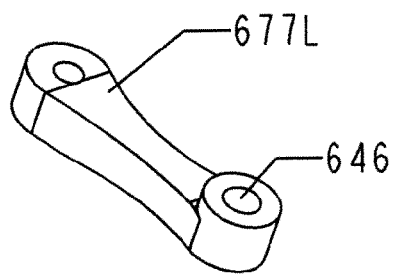
FIG. 35  FIG. 36

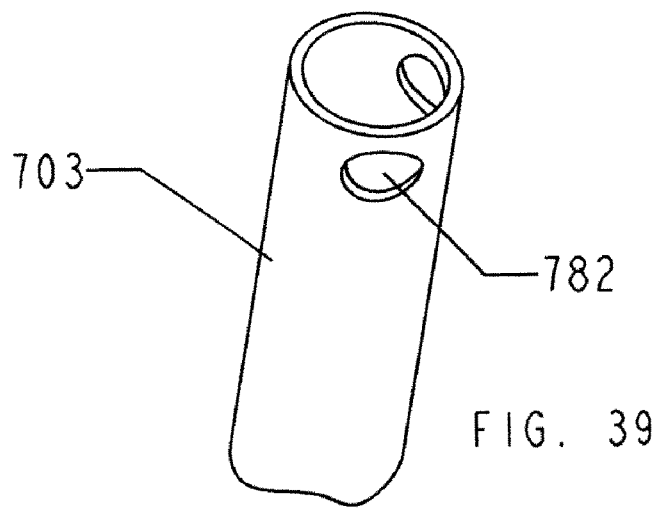
FIG. 39
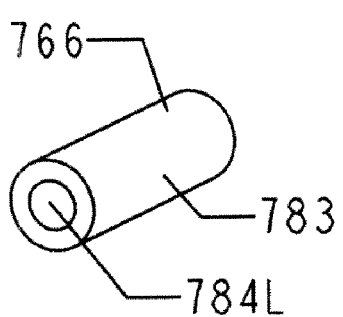
FIG. 40-A
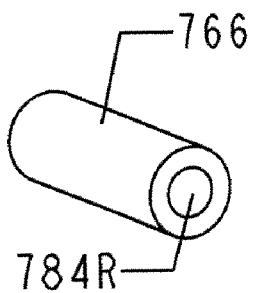
FIG. 40-B
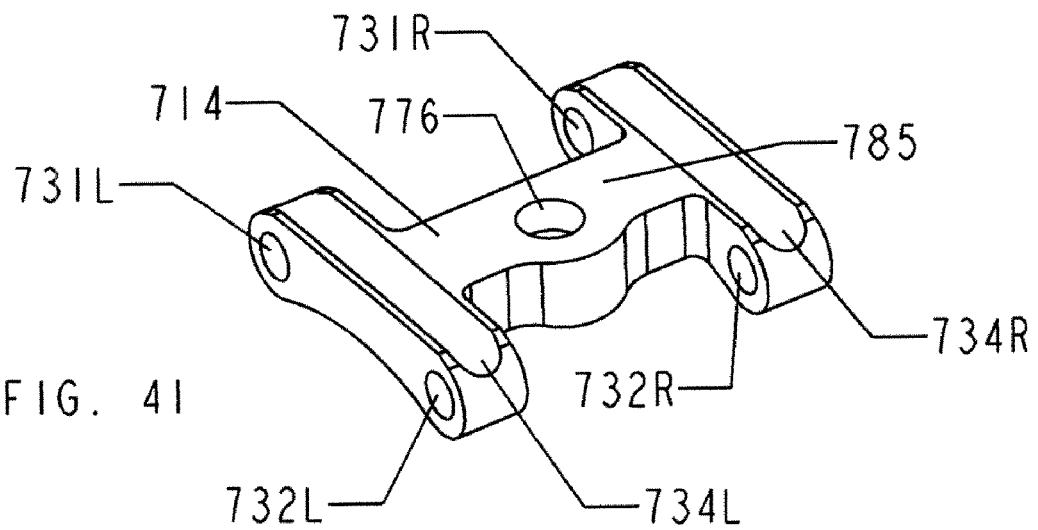
FIG. 41

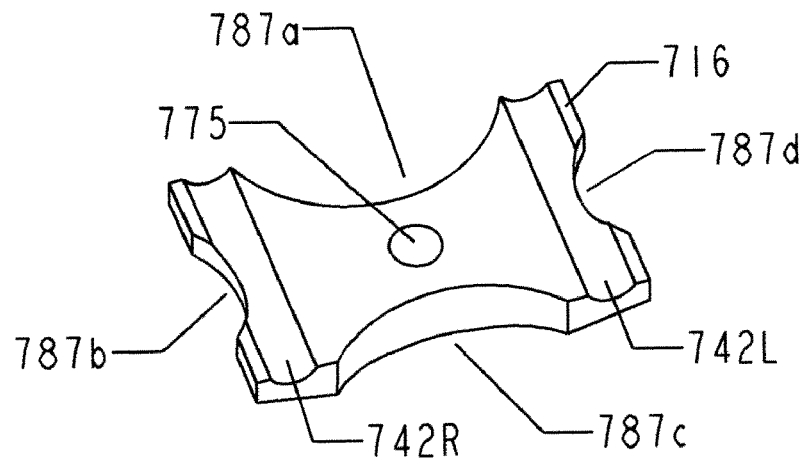
FIG. 42
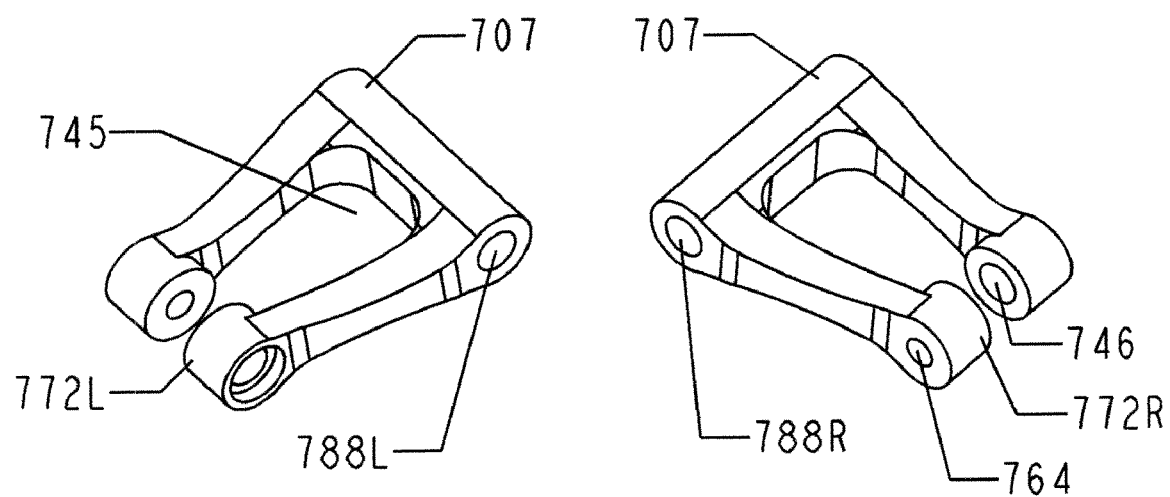
FIG. 43-A FIG. 43-B

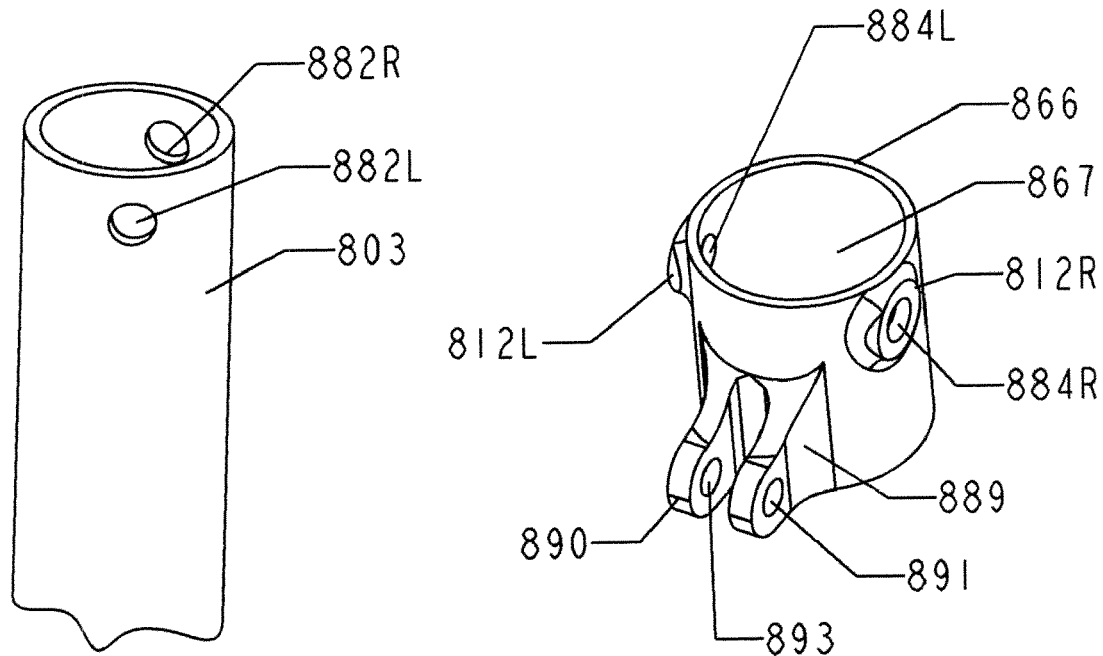
FIG. 46
FIG. 47
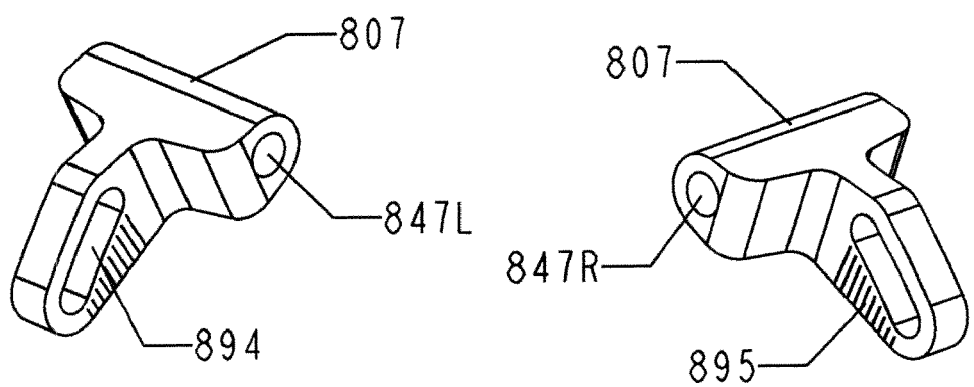
FIG. 48-A
FIG. 48-B

LIGHTWEIGHT THREE-LINK CYCLE SEAT CLAMP

BACKGROUND

1. Field of Invention

The present invention relates to the field of design and construction of bicycle and like cycle seat clamping assemblies. More specifically, the present invention relates to assemblies that attach the rails or wires that form the lower portion of the seat to the seat post.

2. Discussion of Prior Art

In general, cycle seat clamping assemblies are used to attach the seat to the seat post.

This invention is primarily designed for lightweight applications. Weight is a very important design consideration in many types of bicycle and like cycle disciplines.

The prior art often allows adjustability in seat angle and horizontal position. In some prior art it is desirable to make adjustments with as few fasteners as possible. Other designs use more fasteners but are lighter weight or are easier to adjust. Some prior art states that it is better to adjust the seat angle and horizontal position simultaneously, while others claim independent adjustment is better. It is sometimes desirable to provide calibration scale to indicate the seat angle.

Another common feature in the prior art is to have rearward offset of the seat clamping assembly in the horizontal direction from the centerline of the post. This is done to put the rider's weight in a more preferred position while allowing the seat clamping assembly to clamp the seat in a more central position. Some bicycles work better with a horizontal offset and others are designed to work better without this offset. There is no true standard for horizontal offset.

The horizontal offset described above creates a need for support off the centerline of the seat post. This often leads to cantilevered support structures off the back of the seat post. These cantilevered support structures are often bulky and heavy due to the necessity to design for cantilever bending loads. Some examples of these cantilevered designs are U.S. Pat. Nos. 2,920,911 (1960) to Campagnolo, 4,275,922 (1981) to Juy, 4,568,121 (1986) to Kashima, 4,995,753 (1991) to Shook, 5,226,624 (1993) to Kingsberry, 5,547,155 (1996) to Herting, and 6,164,864 (2000) to Beach, Mizek, and Paes.

Some designs use threaded set screws or threaded rods as adjustments to the seat angle. These adjustments are sometimes hard to reach and difficult to adjust. The threaded rods or set screws also provide little structural support in any direction other than along the axis of the threaded shaft. This single direction of structural support necessitates additional weight, strength and stiffness in the other parts of the assembly. Some examples of assemblies with set screw or threaded rod seat angle adjustments are U.S. Pat. Nos. 4,995,753 (1991) to Shook, 5,226,624 (1993) to Kingsberry, 5,571,273 (1996) to Saarinen, and 6,174,027 (2001) to Lemmens.

U.S. Pat. No. 6,174,027 to Lemmens uses a seat support pivotably attached to one end of a seat post with a threaded rod and knob as an angular control adjustment between the seat support and the seat post. This example of prior art is not ideal for lightweight applications. The threaded rod adjustment only serves to define the seat angle by separating the seat support and seat post. The threaded rod provides no support in any other direction due to the necessity of the rod to rotate for adjustment. The threaded rod is continuously free to rotate about at least one end. Additionally, the threaded joints that the rod threads into do not provide significant support to resist side and bending loads since they must be kept loose enough to allow free movement of the threads. Furthermore, to make the threaded rod and knob adjustment easily available while the bicycle is being ridden it is located a considerable distance from the seat rails, making the seat support structure carry significant bending loads. This lack of structural support from the angular control adjustment and remote adjustment location with respect to the seat rails creates stress and load conditions that lead to a heavy and bulky assembly.

SUMMARY OF THE INVENTION

The present invention is a novel and unique adjustable seat clamping assembly used to attach the seat rails of a bicycle or like cycle seat to a seat post. The invention utilizes three pivotably connected structural links or a truss structure to support the seat. The seat can be adjusted in horizontal position and angular position. Additionally, the assembly can be adjusted in horizontal offset.

It has been discovered according to the present invention that by using a three-link structure as the seat clamping assembly, both independent and simultaneous seat position adjustment embodiments can be produced.

It has also been discovered according to the present invention that by using a three-link structure as the seat clamping assembly, a horizontal offset adjustment can be incorporated into the design without altering the seat clamping area.

It has additionally been discovered according to the present invention that by using a three-link structure as the seat clamping assembly, weight can be reduced by minimizing bending loads in the assembly components.

It has further been discovered according to the present invention that certain embodiments allow for unique and novel adjustment schemes and mechanisms.

It has even further been discovered according to the present invention that certain embodiments allow for unique and novel adjustment calibration scales.

Additionally, it has been discovered according to the present invention that by using links that provide significant structural support in more than one direction, the overall weight of the assembly can be reduced.

In general, the invention is composed of a triangular three-link structure. The seat post is contained within the first link. The seat is contained within the second link. A third link acts as a support structure between the first and second and completes the triangular structure. Each link or link assembly provides structural support in more than one direction.

In more detail, the invention is composed of three links. Each link can rotate about two pivot axes. The first link is attached to or contains the seat post. The seat is attached into the second link. One pivot of the first link is attached to one pivot of the second link. The third link is attached between the other pivots of the first and second links. Horizontal position is adjusted by changing the horizontal clamping location of the seat or seat rails. Angular position is adjusted by changing the distance between at least two of the pivot axes. Depending on the type of attachment the pivot axes can remain free to rotate or lock in place. Weight savings can be increased by appropriately locating the pivot attachments of the three-link structure in close proximity to the seat post and/or seat rails.

DESCRIPTION OF DRAWINGS

FIG. 5 is a top perspective view of a seat post.

FIG. 6-A is a perspective view of the inside of a pivot spacer.

FIG. 6-B is a perspective view of the outside of a pivot spacer.

FIG. 7-A is a perspective view of the outside of a seat rail support.

FIG. 7-B is a perspective view of the inside of a seat rail support.

FIG. 8-A is a perspective view of the outside of a clamping member.

FIG. 8-B is a perspective view of the inside of a clamping member.

FIG. 9 is a top perspective view of a support link.

FIG. 18-A is a top perspective view of the left side of a pivot adjustment collar.

FIG. 18-B is a top perspective view of the right side of a pivot adjustment collar.

FIG. 19 is a top perspective view of a support link.

FIG. 22 is a top perspective view of a seat post.

FIG. 23-A is a top perspective view of a pivot attachment member.

FIG. 23-B is a bottom perspective view of a pivot attachment member.

FIG. 32-A is a top perspective view of a pivot attachment member.

FIG. 32-B is a bottom perspective view of a pivot attachment member.

FIG. 33-A is a top perspective view of a seat rail support.

FIG. 33-B is a bottom perspective view of a seat rail support.

FIG. 34-A is a top perspective view of a clamping member.

FIG. 34-B is a bottom perspective view of a clamping member.

FIG. 35 is a bottom perspective view of a support arm.

FIG. 36 is a bottom perspective view of a support arm.

FIG. 39 is a top perspective view of a seat post.

FIG. 40-A is a top perspective view of the left side of a pivot attachment member.

FIG. 40-B is a top perspective view of the right side of a pivot attachment member.

FIG. 41 is a top perspective view of a seat rail support.

FIG. 42 is a bottom perspective view of a clamping member.

FIG. 43-A is a top perspective view of the left side of a support link.

FIG. 43-B is a top perspective view of the right side of a support link.

FIG. 46 is a top perspective view of a seat post.

FIG. 47 is a top perspective view of a pivot attachment member.

FIG. 48-A is a top perspective view of the left side of a support link.

FIG. 48-B is a top perspective view of the right side of a support link.

DETAILED DESCRIPTION OF THE INVENTION

Figure 1:
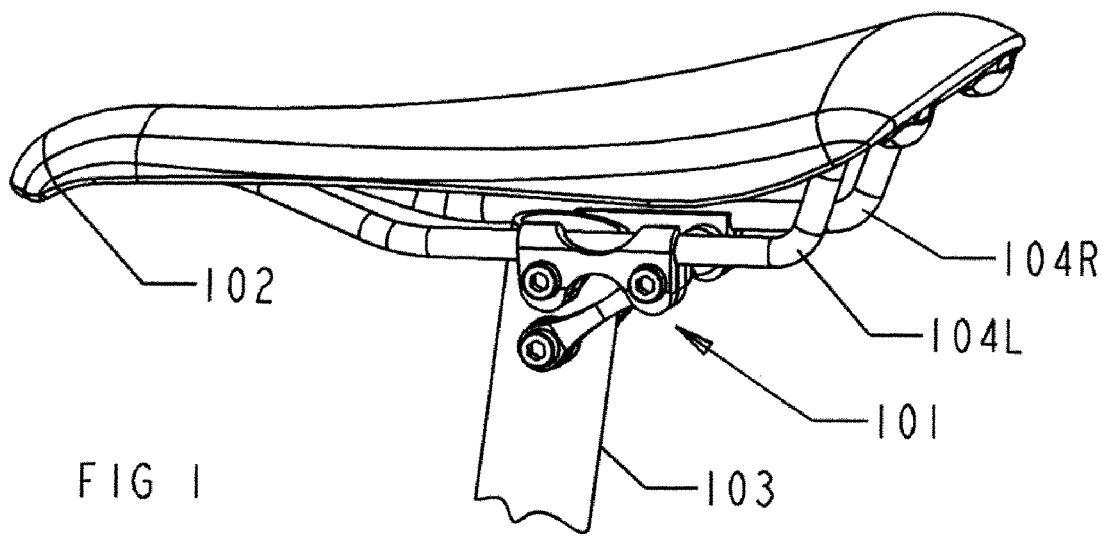
FIG. 1 is a top perspective view of the first embodiment along with the seat.

Although specific embodiments of the present invention will now be described with reference to the drawings, it should be understood that such embodiments are by way of example only and merely illustrative of a few possible specific embodiments that show the essence of the invention. Various changes and modifications obvious to one skilled in the art to which the present invention pertains are deemed to be within the spirit, scope and contemplation of the present invention.

It should be noted that like reference numerals are used to designate like parts throughout all figures and views. The hundreds digit has been used to help distinguish between different embodiments starting with 100 for the first embodiment.

The reader will appreciate that the terms of relative position, such as upper, lower, front, rear, right (R) and left (L) are used with reference to a bicycle that is standing upright with both wheels on the ground. The reader will also appreciate that these terms are not intended to limit the invention. For example, the invention could be used in a rearward facing direction relative to the following descriptions thus reversing the terms right, left, front and rear.

Description—FIGS. 1-9—First Embodiment

The number 100 has been added to reference numbers to indicate this first embodiment.

A simple embodiment of the invention is shown in FIG. 1. An adjustable seat clamping assembly 101 is used in conjunction with a conventional bicycle or like cycle seat 102. A quill or seat post 103 is attached to a bicycle or like cycle (not shown) in any conventional method known to one skilled in the art. Two conventional seat rails 104R and 104L are attached to and extend below the lower portion of seat 102 to allow them to be clamped into adjustable seat clamping assembly 101.

Figure 2:
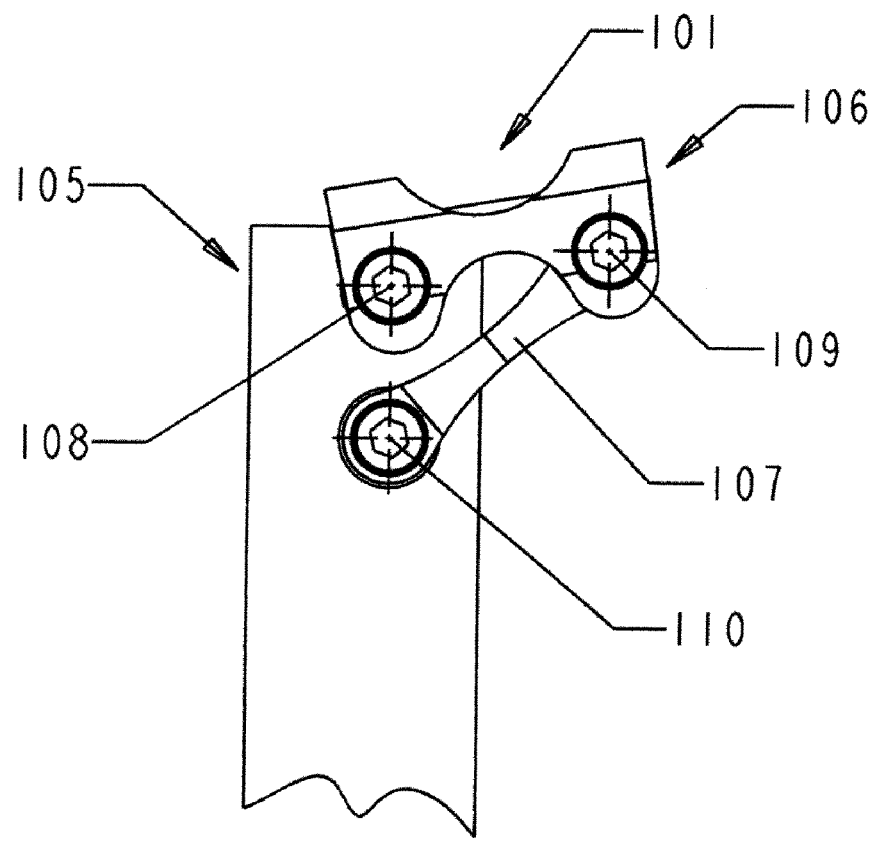
FIG. 2 is a side elevational view of the first embodiment showing the primary components of the present invention as well as the three pivot axes (shown perpendicular to the page).

Referring now to FIG. 2, adjustable seat clamping assembly 101 is composed of three primary elements: a quill link 105, a clamp link 106, and a support link 107, all assembled together to form a simple embodiment of the present invention. Quill link 105 is pivotally assembled to clamp link 106 to create an upper pivot axis 108. Clamp link 106 is pivotally assembled to support link 107 to create a rear pivot axis 109. Support link 107 is pivotally assembled to quill link 105 to create a lower pivot axis 110. These axes are shown perpendicular to the page.

Figure 3:
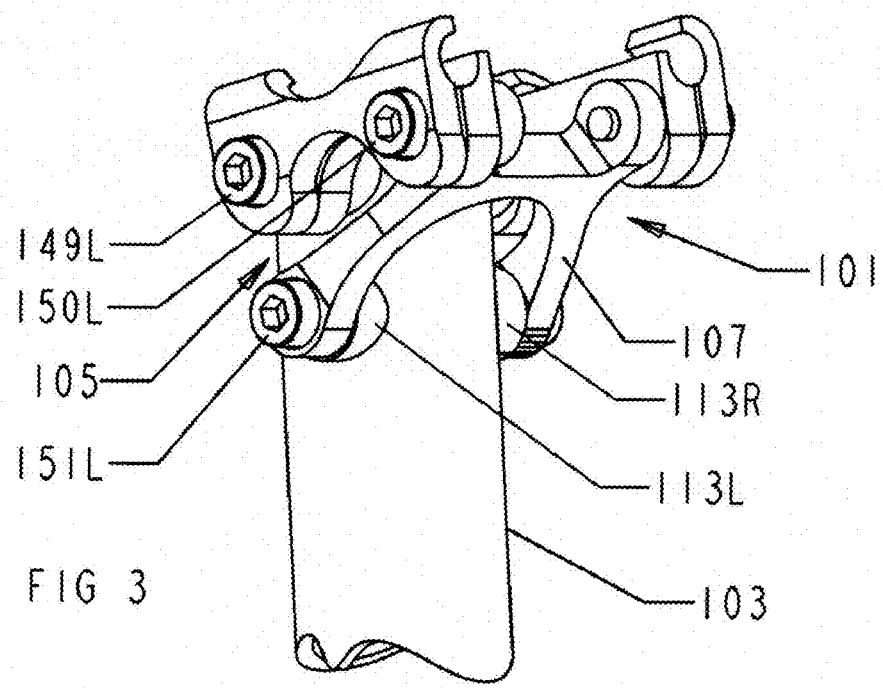
FIG. 3 is a bottom perspective view of the first embodiment.
Figure 4:
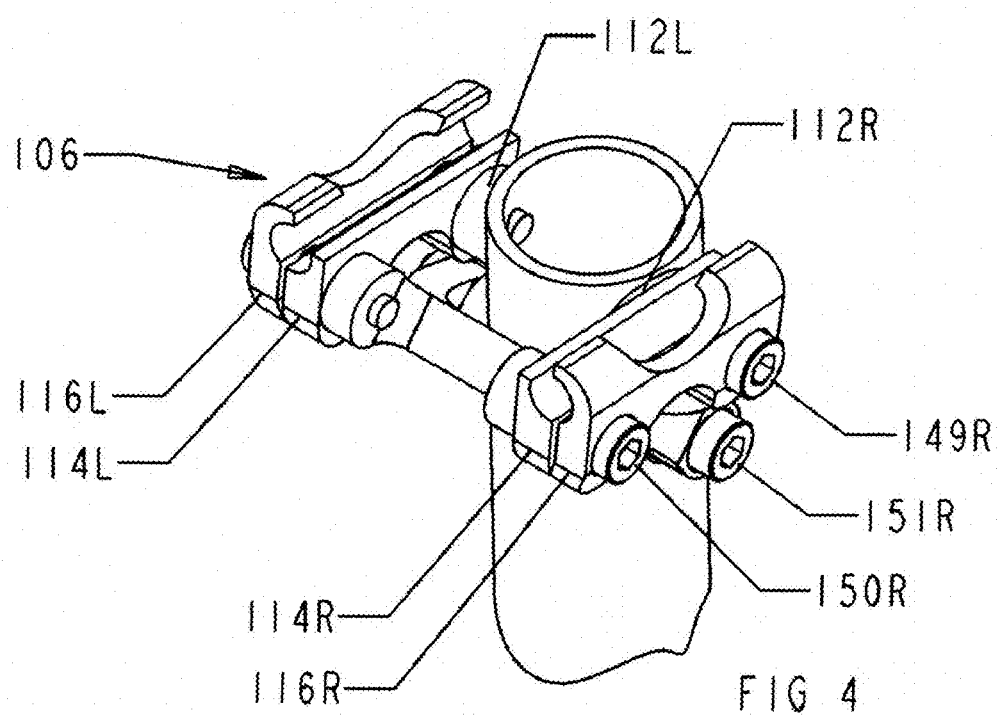
FIG. 4 is a top perspective view of the first embodiment.

Referring now to FIGS. 3-4, quill link 105 primarily contains seat post 103, two upper pivot spacers 112R and 112L, and two lower pivot spacers 113R and 113L. Clamp link 106 primarily contains two seat rail supports 114R and 114L and two clamping members 116R and 116L. Additionally, the seat rails are clamped into clamp link 106.

Seat post 103 (FIG. 5) has an inner surface 119, an outer surface 120 and a center axis 121. Two upper threaded holes 122R and 122L are formed through the right and left sides of the seat post. Two lower threaded holes 123R and 123L are also formed through the right and left sides of the seat post.

Upper pivot spacers 112R and 112L and lower pivot spacers 113R (FIGS. 6-A and 6-B) and 113L each have a bore 124, an inner face 125 and an outer face 126. Inner face 125 is shaped to contact the outer surface of the seat post. Additionally, pivot spacer 123R includes an indicating mark 127.

Seat rail supports 114R (FIGS. 7-A and 7-B) and 114L have an inside face 129 and an outside face 130, a forward bore 131, a rearward bore 132, a slanted clamping contact region 133, a longitudinal groove 134 and a cutout 135. Inside face 129 is shaped to contact the outer face of the upper pivot spacers 112R and 112L. The seat rails rest in the longitudinal grooves. Cutout 135 reduces weight.

Clamping members 116R (FIGS. 8-A and 8-B) and 116L have an inside face 137, an outside face 138, a forward bore 139, a rearward bore 140, a slanted clamping contact region 141, a longitudinal groove 142 and two cutouts 143a and 143b. Cutouts 143a and 143b reduce weight.

Support link 107 (FIG. 9) has a calibration scale 144, two cutouts 145a and 145b, two bores 146R and 146L, and two threaded holes 147R and 147L. Cutout 145a allows for clearance around the quill link. Cutout 145b reduces weight.

Referring now to FIGS. 3-4, on the right side of adjustable seat clamping assembly 101, an upper threaded fastener 149R passes through the forward bore of clamping member 116R, the forward bore of seat rail support 114R, the bore of upper pivot spacer 112R and threads into the right-side upper threaded hole of the seat post creating the upper pivot axis. A rear threaded fastener 150R passes through the rearward bore of clamping member 116R, the rearward bore of seat rail support 114R, and threads into the right-side threaded hole of support link 107 creating the rear pivot axis. A lower threaded fastener 151R is inserted through the right-side bore of support link 107, the bore of lower pivot spacer 113R, and threads into the right-side lower threaded hole of seat post 103 creating the lower pivot axis.

Forward, rearward, upward, and downward seat clamp assembly horizontal offsets can easily be provided by appropriately positioning the upper pivot axis.

The left side of the assembly is assembled similarly using three threaded fasteners 149L, 150L, and 151L.

The upper threaded fasteners and the rear threaded fasteners are tightened to hold the clamp link in place at the upper pivot axis and the rear pivot axis. Additionally, when the upper threaded fasteners and the rear threaded fasteners are tightened, a clamping force is applied between the clamping contact region of the seat rail supports and the clamping contact region of the clamping members. Clamping force is also applied to the seat rails at the longitudinal groove of the seat rail supports and the longitudinal groove of the clamping members. The clamping contact region of the seat rail supports, and the clamping contact region of the clamping members contact each other to create a slightly downward clamping force on the seat rails from the clamping members. Additionally, the clamping contact regions keep the outside face of the clamping members generally perpendicular to the upper pivot axis and the rear pivot axis for proper threaded fastener head engagement.

The lower threaded fasteners hold the support link in place. Additionally, when fully tightened the upper threaded fasteners, the rear threaded fasteners, and the lower threaded fasteners rotationally lock the pivot attachments in place.

The upper pivot spacers, in combination with the seat rail supports and the outside diameter of the seat post, provide the proper clamp spacing between the seat rails in the clamp link.

The assembly can be made of numerous materials utilizing numerous manufacturing techniques. By way of example only, this assembly is made of machined aluminum. It will be appreciated that any suitable lightweight material or combination thereof could be used with any corresponding suitable manufacturing technique including but not limited to composites, titanium, steel and magnesium.

Operation—FIGS. 1-4—First Embodiment

Horizontal seat position is adjusted by loosening the upper threaded fasteners and the rear threaded fasteners to allow the seat rails to slide forward and rearward within the clamp link to the desired position. The assembly is then tightened back up. Horizontal seat position can be adjusted independently of angular seat position.

In this simple embodiment, angular seat position is adjusted by altering the distance between the upper pivot axis and the lower pivot axis. As this distance is increased the angular seat position will be tilted rearward, and as it is decreased the angular seat position will be tilted forward.

Angular position is adjusted by swapping the seat post with different versions primarily having different vertical locations of the lower threaded holes. Each of these versions of the seat post defines a different distance between the upper pivot axis and the lower pivot axis and defines a new angular position. When the new version of the seat post is in place the assembly is tightened back up.

Angular seat position is read by interpreting the relative position of the indicating mark of the right-side lower pivot spacer to the calibration scale of the support link.

Horizontal offset is adjusted in this simple embodiment by swapping the seat post with different versions having different horizontal locations of the upper threaded holes. Additionally, each seat post version has a two position horizontal offset adjustment. Horizontal offset can be adjusted between two positions by removing the seat post, rotating it 180 degrees about the center axis, and assembling it back into the assembly. The exception to this two position offset adjustment is when upper pivot axis 108 intersects the center axis of the seat post.

It will be appreciated that the present invention is not limited to the threaded hole and fastener pivot attachments described above. Any of a variety of ways known to one skilled in the art can be used to establish the upper pivot axis, the rear pivot axis and the lower pivot axis including but not limited to pins, threaded inserts, t-nuts, sex bolts, and rivets. Pivot attachments can either lock in place or remain free during operation. Furthermore, the pivot axes and the attachment points do not need to be coincident.

It will also be appreciated that the invention will not be limited to the location of the upper pivot axis and the lower pivot axis within the seat post. These pivot axes can be located by an adapter member attached to a seat post or by other components attached to a seat post. Furthermore, it will be appreciated that with respect to the pivot axes the terms upper, lower and rear have been used for example only and are not meant to limit the location of any one pivot above, below or behind another.

It will also be appreciated that the present invention will not be limited to the seat rail clamping scheme described above. Any scheme or structure known to one skilled in the art that could be used to attach a seat to the clamp link can be used, including but not limited to schemes with single seat rails or a plurality of seat rails. Furthermore, the seat could be an integral part of the clamp link.

It will further be appreciated that the present invention is not limited to the angular position adjustment described above. This is only a simple form of adjustment. Any type of adjustment that alters the distance between any two of the three pivot axes will result in an angular position adjustment. Alterations of more than one of these distances can also result in angular position adjustment.

It will still further be appreciated that the present invention is not limited to the calibration scale and mark described above. Many other locations including but not limited to any of the pivot attachment locations can make a suitable location for an indicating mark or edge and complimentary calibration scale. Calibration scale locations can vary depending upon what type of angular adjustment scheme is used. The indicating mark and the calibration scale do not necessarily affect the structural performance or function of the adjustable seat clamping assembly and the present invention should not be limited in such a way as to require these elements.

It will even further be appreciated that the present invention is not limited to the right and left seat rail supports, the right and left seat rail clamps, or to the singular part or non-assembly support link. Some of these components can be combined and/or divided.

Description—FIGS. 10-13—Second Embodiment

Figure 10:
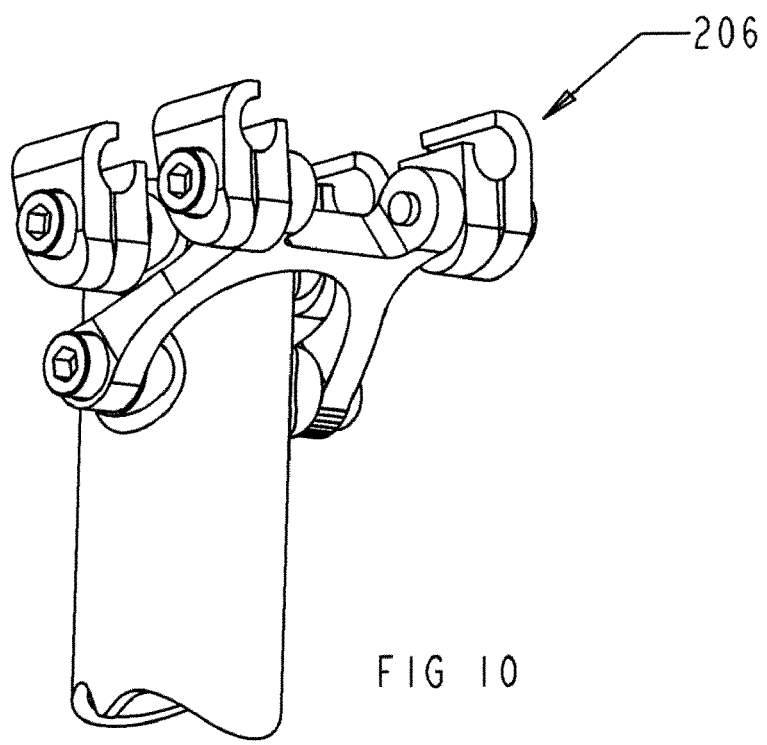
FIG. 10 is a bottom perspective view of the second embodiment.
Figure 11:
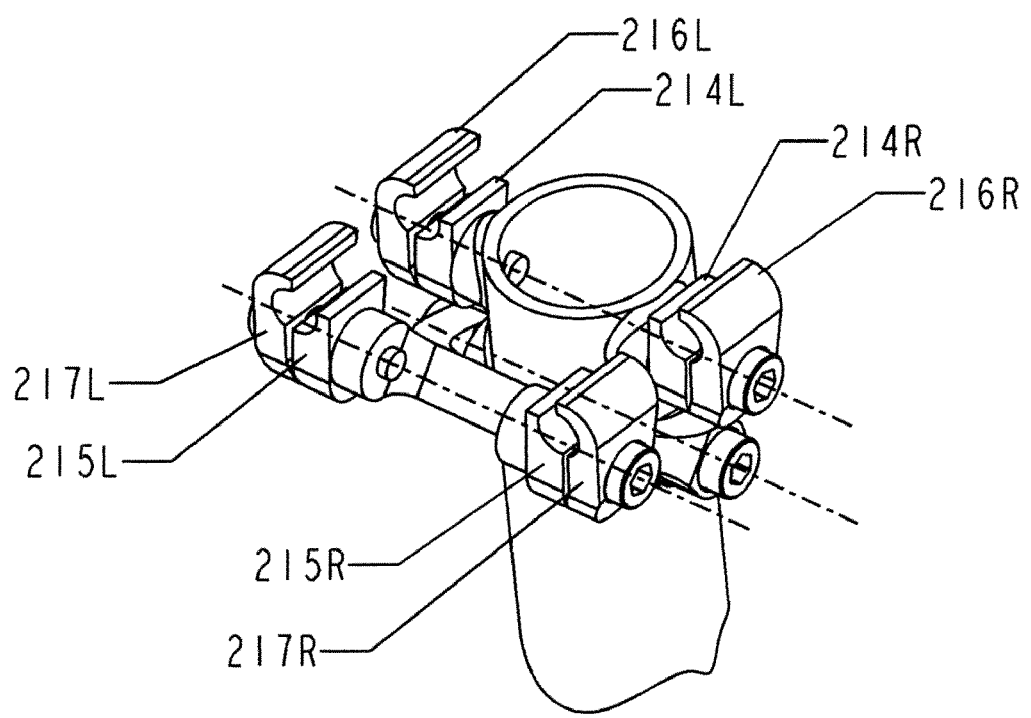
FIG. 11 is a top perspective view of the second embodiment.
Figure 12:
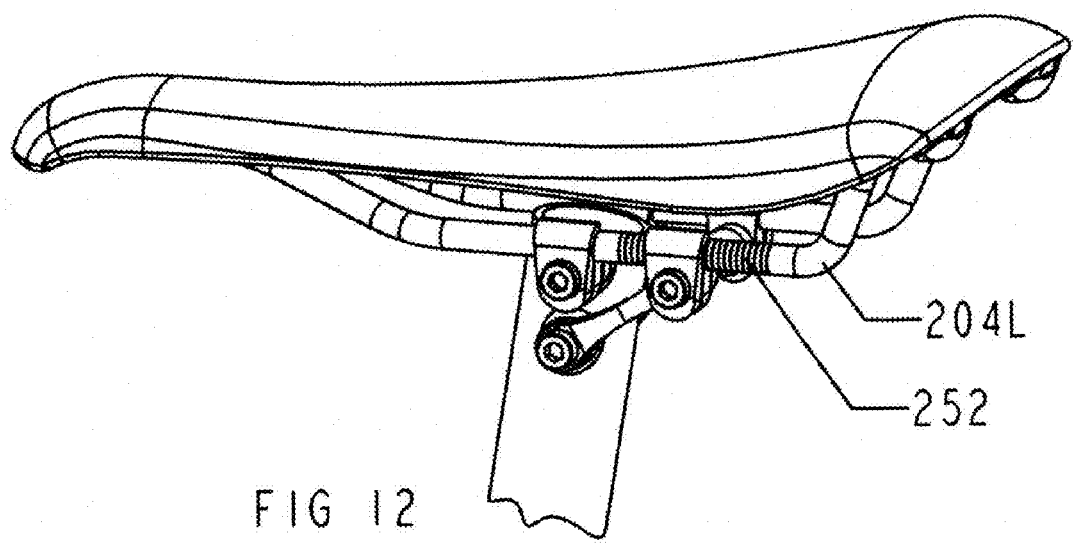
FIG. 12 is a top perspective view of the second embodiment along with the seat.
Figure 13:
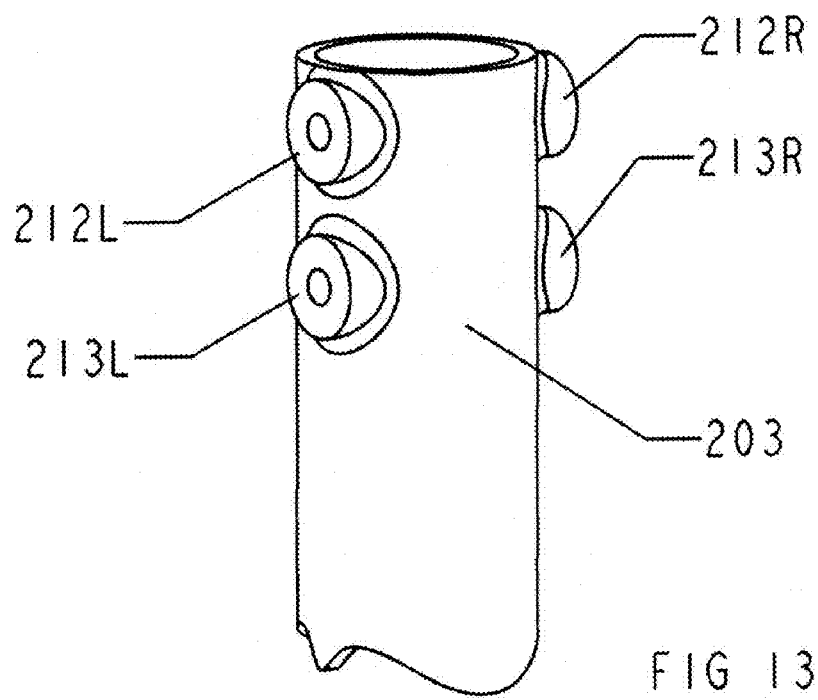
FIG. 13 is a top perspective view of a seat post.

A second and alternate embodiment of the present invention is shown in FIGS. 10-12. It is nearly identical to the first embodiment described in FIGS. 1-9 above and the description thereof will not be repeated. Only modified components will be described in detail below. The number 200 has been added to reference numbers to indicate parts of this second embodiment.

This second embodiment is extraordinarily light and primarily demonstrates a novel and unique angular adjustment and calibration scale.

Referring now to FIGS. 10-11, clamp link 206 has additional components. The seat rail supports as described in the first embodiment are divided into two pieces each, creating two upper seat rail supports 214R and 214L, and two rear seat rail supports 215R and 215L. Additionally, the clamping members as described in the first embodiment are divided into two pieces each, creating two upper clamping members 216R and 216L, and two rear clamping members 217R and 217L.

As shown in FIG. 12, seat rail 204L has a calibration scale 252.

The pivot spacers as described in the first embodiment are formed integrally into a seat post 203 (FIG. 13) as upper bosses 212R and 212L and lower bosses 213R and 213L.

Operation—FIGS. 10-13—Second Embodiment

Independent horizontal position is adjusted by fully loosening the upper threaded fasteners, the rear threaded fasteners, and leaving tight the lower threaded fasteners. The seat rails are then slid horizontally to the desired position and the assembly is tightened back up.

Angular position is adjusted by altering the distance between the upper pivot axis and the rear pivot axis. As this distance is shortened the angular position is tilted forward, and as it is lengthened the angular position is tilted rearward.

Simultaneous adjustment is done by greatly loosening the assembly at each threaded fastener and pivoting the support link about the lower pivot axis while sliding the rear seat rail supports and the rear clamping members along the seat rails until desired angular position is obtained. At the same time, the seat rails are slid horizontally to the desired position. When both adjustments are at their desired settings, the assembly is tightened back up preferably starting with one of the upper or rear threaded fasteners.

Independent angular position is adjusted by fully loosening the rear threaded fasteners, the lower threaded fasteners, and partially loosening the upper threaded fasteners just enough to allow the clamp link to pivot about the upper pivot axis without allowing the seat rails to slide within the upper seat rail supports and the upper clamping members. The rear seat rail supports and the rear clamping members are then slid forward or backward along the seat rails until the desired angular position is achieved. The assembly is then tightened back up.

Angular position is read by interpreting the location of the left side rear clamping member with respect to the calibration scale of the support link.

It will be appreciated that this embodiment describes only one of many possible schemes for adjusting angular position by altering distance between the upper pivot axis and the rear pivot axis.

It will also be appreciated that the calibration scale described above is outlined for example only and other locations can be used with similar results.

Description—FIGS. 14-19—Third Embodiment

Figure 14:
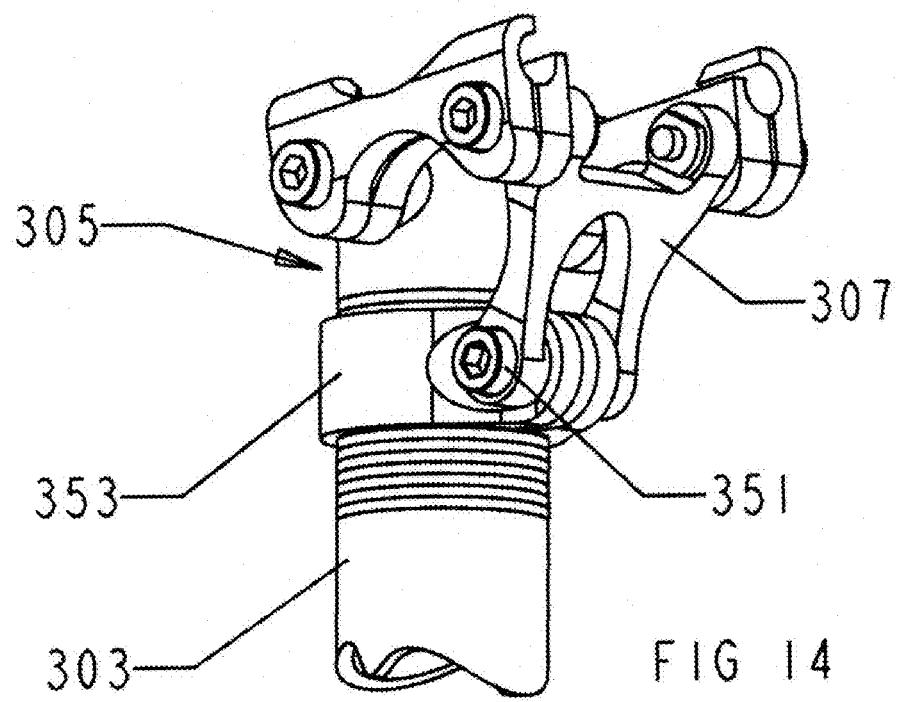
FIG. 14 is a bottom perspective view of the third and preferred embodiment.
Figure 15:
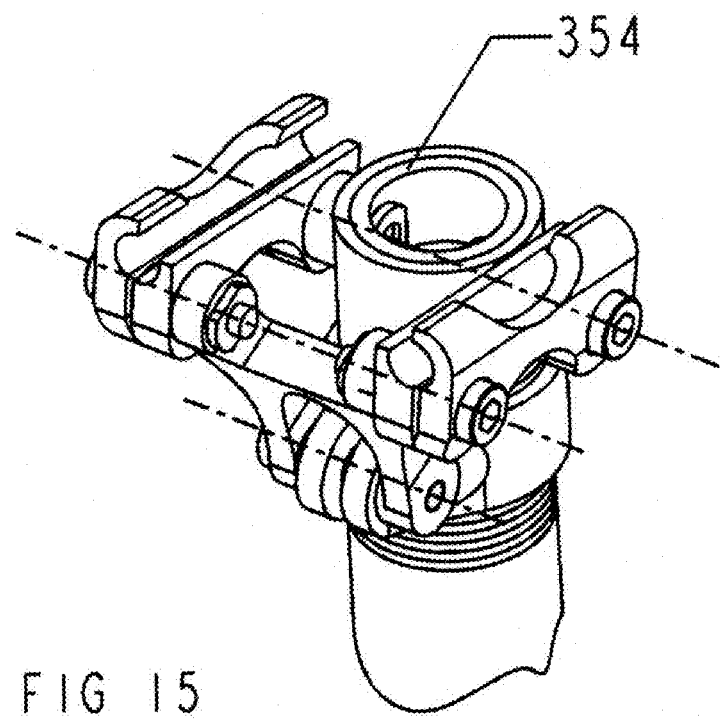
FIG. 15 is a top perspective view of the third and preferred embodiment.
Figure 16:
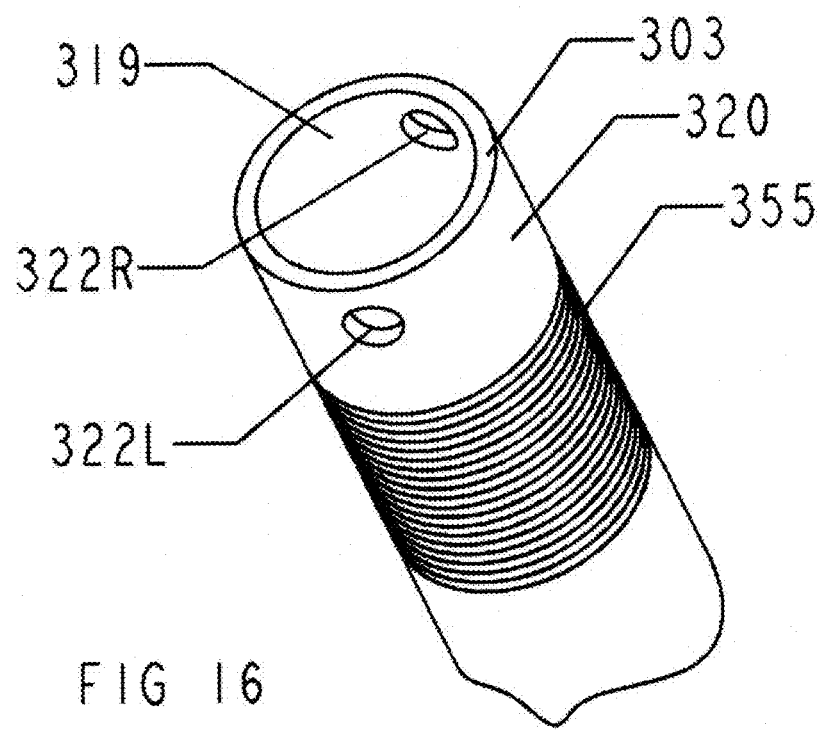
FIG. 16 is a top perspective view of a seat post.
Figure 17:
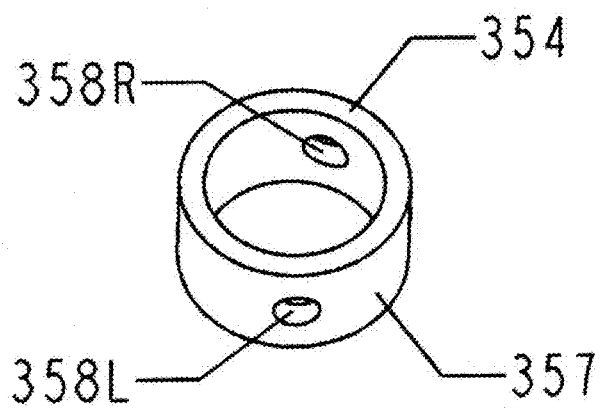
FIG. 17 is a top perspective view of a seat post reinforcement insert.

A third and preferred embodiment of the present invention is shown in FIGS. 14-15. It is nearly identical to the first embodiment described in FIGS. 1-9 above and the description thereof will not be repeated. Only additional and modified components will be described in detail below. The number 300 has been added to reference numbers to indicate this third embodiment.

This third embodiment is very light, and primarily demonstrates an additional novel and unique angular adjustment and calibration scale scheme that is easy to read and highly visible.

Referring now to FIGS. 14-15, quill link 305 has two additional components: a pivot adjustment collar 353 and a seat post reinforcement insert 354.

Seat post 303 (FIG. 16) has an inner surface 319, an outer surface 320, and two upper threaded holes 322R and 322L. Additionally, seat post 303 has a calibration scale 355.

Seat post reinforcement insert 354 (FIG. 17) has an outer surface 357 and two threaded holes 358R and 358L. Outer surface 357 has a slightly smaller diameter than the inner surface of the seat post.

Referring to FIGS. 18-A and 18-B, pivot adjustment collar 353 has an inside surface 359, two holes 360R and 360L, a cutout 361, and two bores 362R and 362L. The inside surface has nearly the same diameter as the outer surface of the seat post.

Referring to FIG. 19, support link 307 has two cutouts 345a and 345b, a bore 346, two threaded holes 347R and 347L, two bosses 363R and 363L, and a lower threaded hole 364. Cutout 345b reduces weight. Bosses 372R and 372L are shaped to abut and interlock with the right and left bores of the pivot adjustment collar.

Referring now to FIGS. 14-15, seat post reinforcement insert 354 is inserted and bonded into seat post 303. The right and left upper threaded holes of the seat post and the right and left threaded holes of the seat post reinforcement insert are then created simultaneously to assure proper thread engagement. The seat post reinforcement insert helps distribute the loads at the upper pivot axis into the seat post, and it provides additional thread engagement length for the upper threaded fasteners.

The right and left bosses of the support link are inserted into the right and left bores of the pivot adjustment collar. The pivot adjustment collar is placed over the outer surface of the seat post. A lower threaded fastener 351 passes through the bore of the support link, through the right and left holes of the pivot adjustment collar, and threads into the lower threaded hole of the support link. The remainder of the adjustable seat clamping assembly is assembled in a similar manner as the first embodiment.

The lower threaded fastener serves two main purposes. It attaches the quill link to the support link and it provides clamping force to the pivot adjustment collar locking it in place on the seat post.

Operation—FIGS. 14-15—Third Embodiment

Horizontal seat position is adjusted similarly to the first embodiment and can be adjusted independently of angular position.

Angular seat position is adjusted by altering the distance between the upper pivot axis and the lower pivot axis. As this distance is increased the angular seat position is tilted forward, and as it is decreased the angular seat position is tilted rearward.

Angular seat position is adjusted independently by first slightly loosening the upper threaded fasteners, the rear threaded fasteners, and greatly loosening the lower threaded fastener. This allows rotation about the upper pivot axis, the rear pivot axis, and the lower pivot axis. It also allows the pivot adjustment collar to slide along the seat post, altering the distance between the upper pivot axis and the lower pivot axis. As the pivot adjustment collar is moved up the angular position is tilted forward, and as it is moved down the angular position is tilted rearward.

Angular position is indicated by interpreting the relative position of the adjustment collar to the calibration scale of the seat post.

It will be appreciated that the present invention should not be limited to the bonded in seat post reinforcement insert described above. Any attachment technique known to one skilled in the art could be used such as but not limited to press-fit, welding, or threading. Alternatively, no attachment technique is needed since upper threaded fasteners 349R and 349L will hold the seat post reinforcement insert in place. Additionally, it can be integrally formed as a reinforced section of a seat post.

It will also be appreciated that this embodiment describes only one of many possible schemes for adjusting angular position by altering distance between the upper pivot axis and the lower pivot axis.

It will further be appreciated that the present invention should not be limited to the lower fastener as described above. Any technique known to one skilled in the art could be used to clamp the adjustment collar in place including but not limited to quick release mechanisms.

Description—FIGS. 20-25—Fourth Embodiment

A fourth and alternative embodiment of the present invention is shown in FIGS. 20-25. It is nearly identical to the third embodiment described in FIGS. 14-19 above and the description thereof will not be repeated. Only additional and modified components will be described in detail below. The number 400 has been added to reference numbers to indicate this fourth embodiment.

This fourth embodiment primarily demonstrates an adjustable seat clamping assembly with no horizontal offset.

Figure 20:
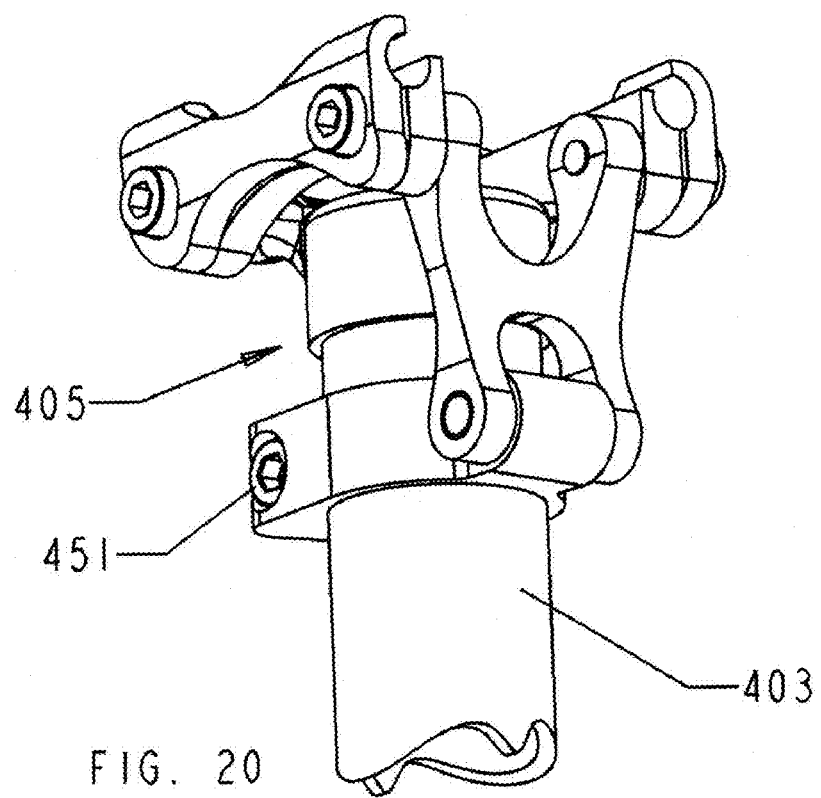
FIG. 20 is a bottom perspective view of the fourth embodiment.
Figure 21:
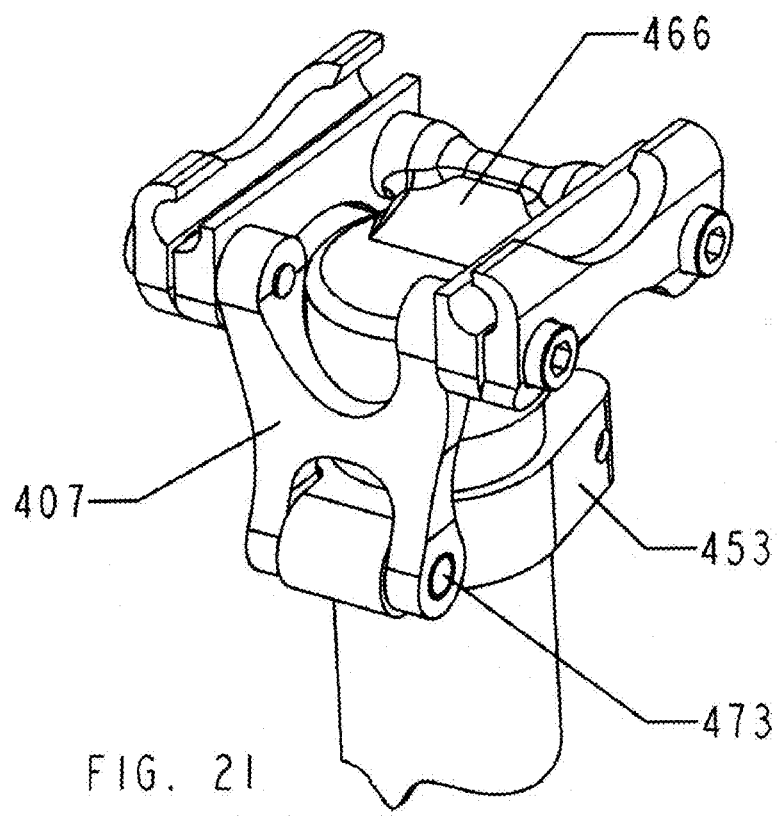
FIG. 21 is a top perspective view of the fourth embodiment.

Referring now to FIGS. 20-21, quill link 405 has one additional component: a pivot attachment member 466. The seat post reinforcement insert as described in the third embodiment is not present in quill link 405.

Seat post 403 (FIG. 22) has no threaded holes and an outside surface 420.

Pivot attachment member 466 is detailed in FIG. 23-A and FIG. 23-B. It has an inside surface 467, a boss 468, and two threaded holes 469R and 469L. Threaded holes 469R and 469L locate the upper pivot axis such that the adjustable seat clamping assembly can have no horizontal offset. Inside surface 467 is slightly larger than the outside surface of the seat post.

Figure 24:
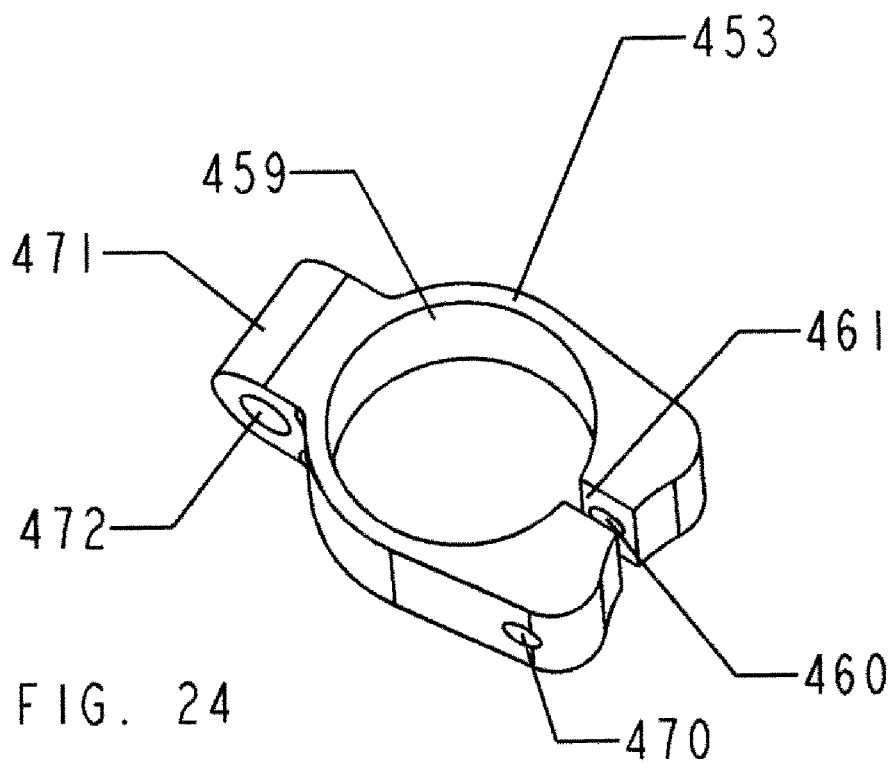
FIG. 24 is a top perspective view of a pivot adjustment collar.

Referring to FIG. 24, pivot adjustment collar 453 has an inside surface 459, a hole 460, a cutout 461, a threaded hole 470, a boss 471 and a pivot bore 472. Inside surface 459 has nearly the same diameter as the outer surface of the seat post. Pivot bore 472 locates the lower pivot axis. The diameter of pivot bore 472 is accurately cut to allow for a press-fit attachment of a lower pin 473 (FIG. 21).

Figure 25:
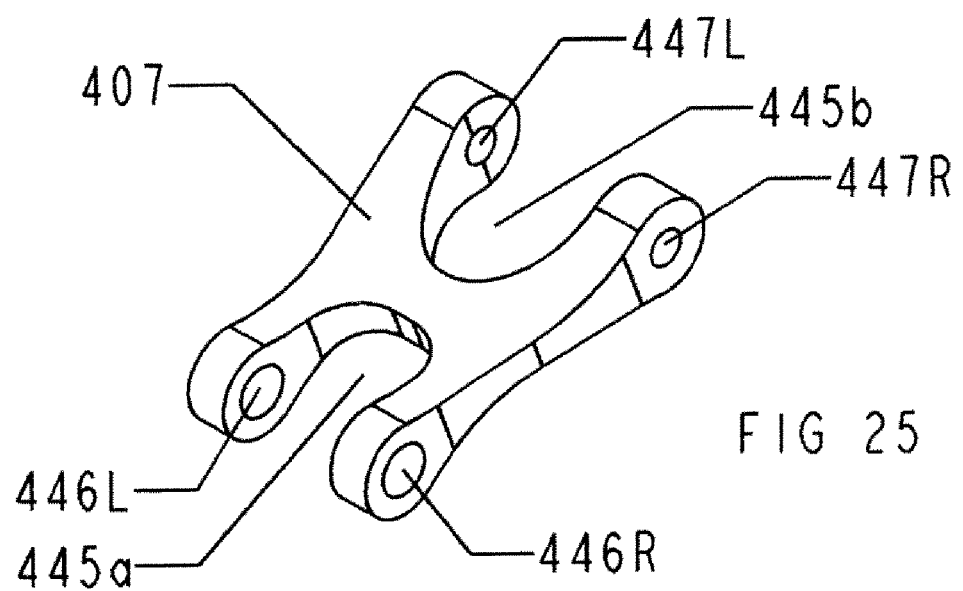
FIG. 25 is a top perspective view of a support link.

Referring to FIG. 25, support link 407 has two cutouts 445a and 445b, two bores 446R and 446L, and two threaded holes 447R and 447L. Bores 446R and 446L are accurately cut to allow tight pivotal motion around the lower pin.

Referring now to FIGS. 20-21, the pivot attachment member is slid over the upper portion of the seat post and attached using an adhesive. Any suitable adhesive known to one skilled in the art could be used.

Lower pin 473 passes through the right and left bores of the support link and is press-fit into the pivot bore of the pivot adjustment collar and attaches quill link 405 to support link 407 creating the lower pivot axis. The lower pin allows continuous free rotational motion of the support link about the lower pivot axis. Lower threaded fastener 451 provides clamping force to the pivot adjustment collar, locking it in position on the seat post.

Operation—FIGS. 20-21—Fourth Embodiment

Operation of this embodiment is nearly identical to the third embodiment using the lower threaded fastener to loosen and tighten the clamping force of the pivot adjustment collar on the seat post.

It will be appreciated that the present invention should not be limited to the bonded on pivot attachment member described above. Any attachment technique known to one skilled in the art could be used such as but not limited to press-fit, welding, or threading. Additionally, it could be an integral portion of a seat post or it could be attached to the inner surface or top surface of a seat post.

Description—FIGS. 26-29—Fifth Embodiment

Figure 26:
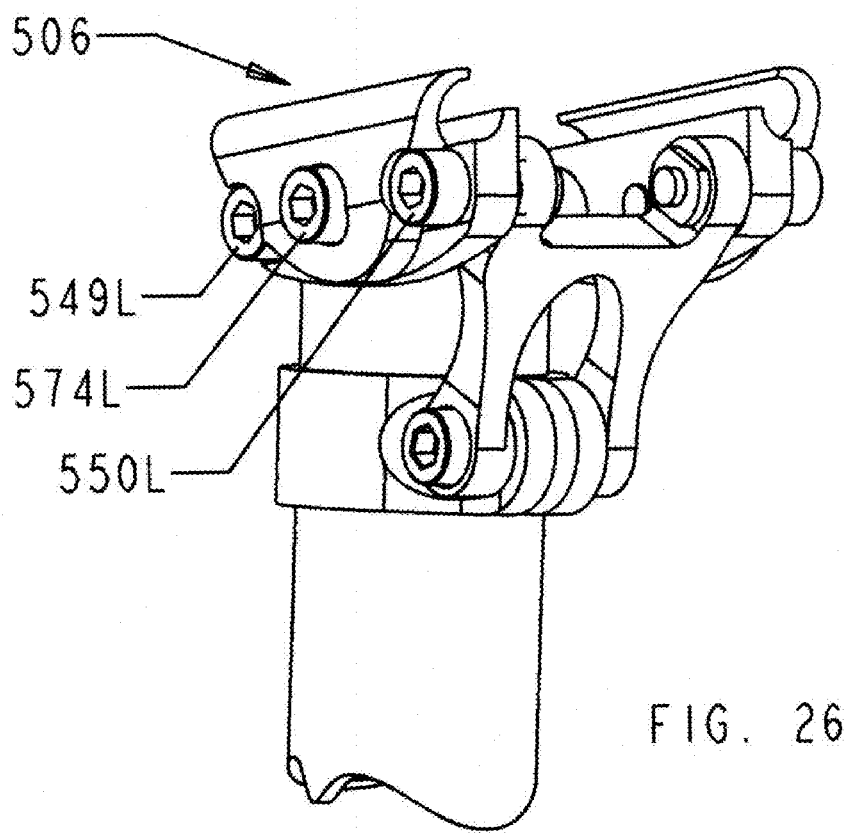
FIG. 26 is a bottom perspective view of the fifth embodiment.
Figure 27:
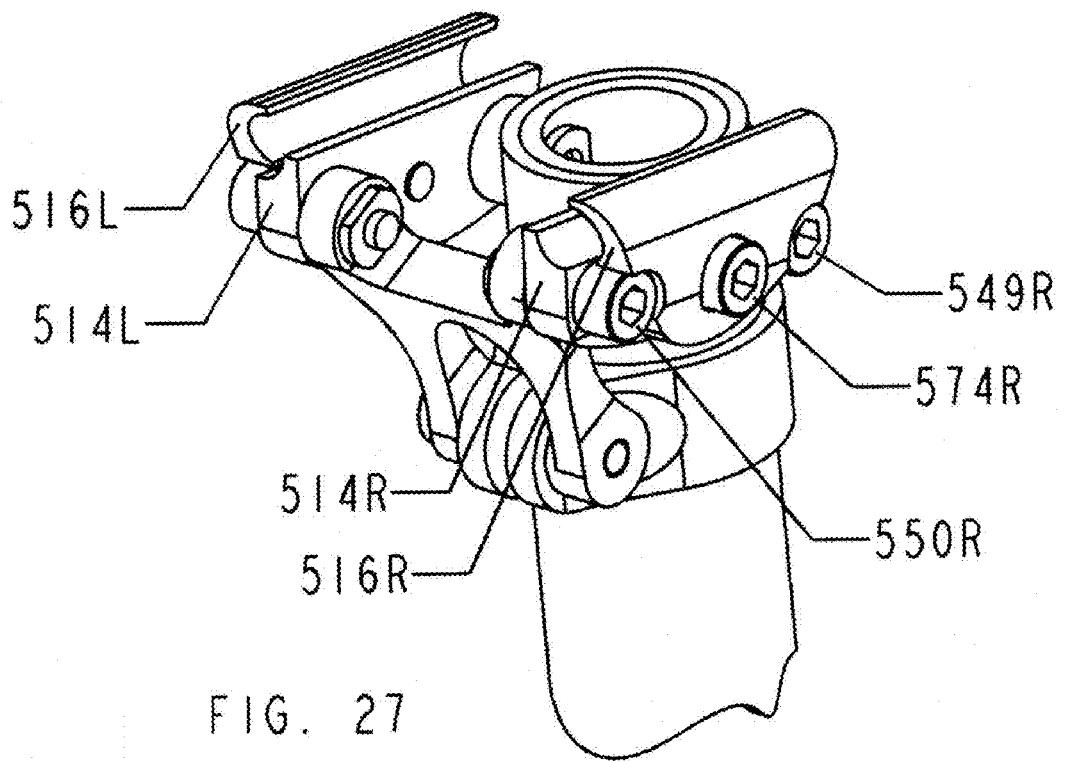
FIG. 27 is a top perspective view of the fifth embodiment.
Figure 28:
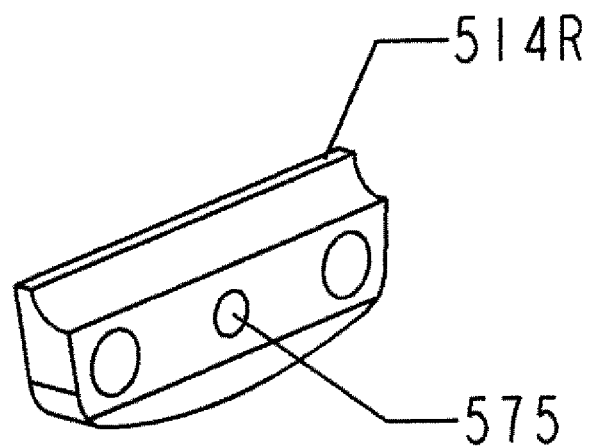
FIG. 28 is a top perspective view of a seat rail support.
Figure 29:
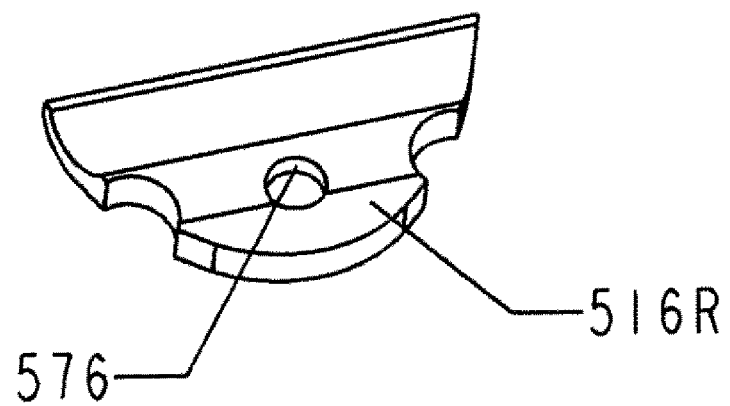
FIG. 29 is a bottom perspective view of a clamping member.

A fifth and alternative embodiment of the present invention is shown in FIGS. 26-27. It is nearly identical to the third embodiment described in FIGS. 14-19 above and the description thereof will not be repeated. Only additional and modified components will be described in detail below. The number 500 has been added to reference numbers to indicate this fifth embodiment.

This fifth embodiment primarily demonstrates a simpler independent adjustment scheme.

Referring to FIGS. 26-27, clamp link 506 has two additional components: two central threaded fasteners 574R and 574L.

Seat rail supports 514R (FIG. 28) and 514L are modified to have a central threaded hole 575.

Clamping members 516R (FIG. 29) and 516L are modified to allow clearance for and around the upper threaded fasteners and the rear threaded fasteners. They additionally have a central bore 576.

Referring now to FIGS. 26-27, upper threaded fasteners 549R and 549L and rear threaded fasteners 550R and 550L attach the clamp link to the quill link and the support link respectively without contacting the clamping members. Central threaded fasteners 574R and 574L pass through the central bore of the clamping members, thread into the central threaded hole of the seat rail supports, and clamp the seat rails in place.

Operation—FIGS. 26-27—Fifth Embodiment

Horizontal position is adjusted by loosening the central threaded fasteners until the seat rails slide freely within the clamp link. When the desired position is obtained, the central threaded fasteners are tightened back up.

Angular position is adjusted independently by loosening the upper threaded fasteners, the rear threaded fasteners, and the lower threaded fastener until all pivots are free to rotate and the pivot adjustment collar is free to slide along the seat post. When the desired angular position is obtained the assembly is then tightened back up.

Description—FIGS. 30-36—Sixth Embodiment

Figure 30:
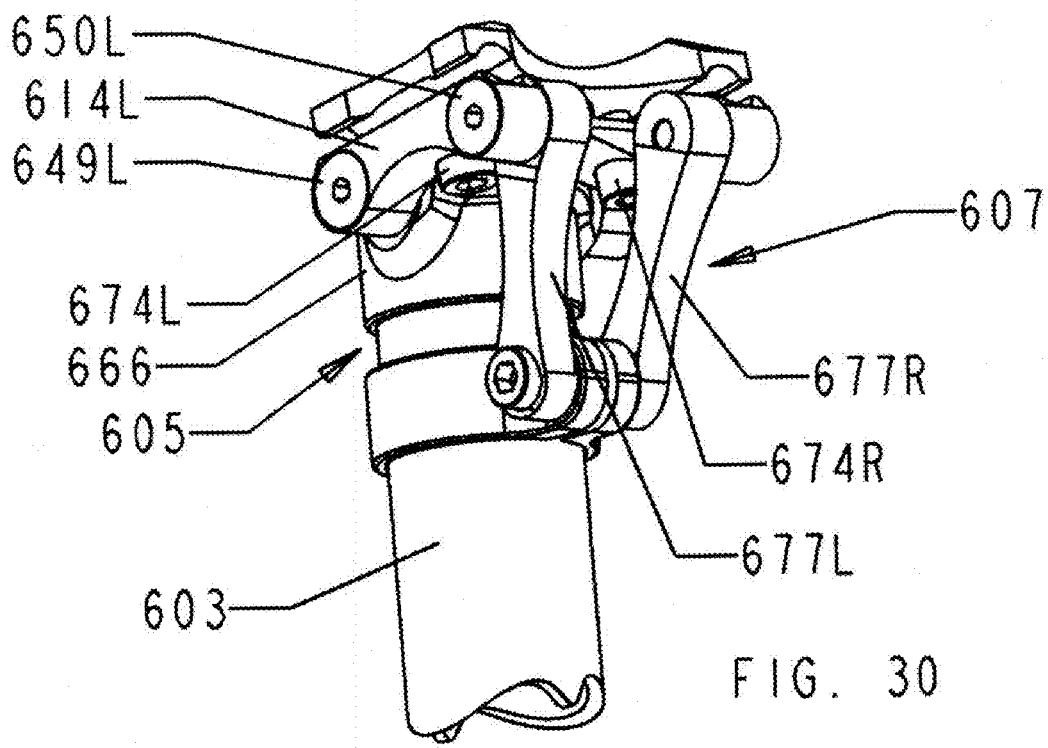
FIG. 30 is a bottom perspective view of the sixth embodiment.
Figure 31:
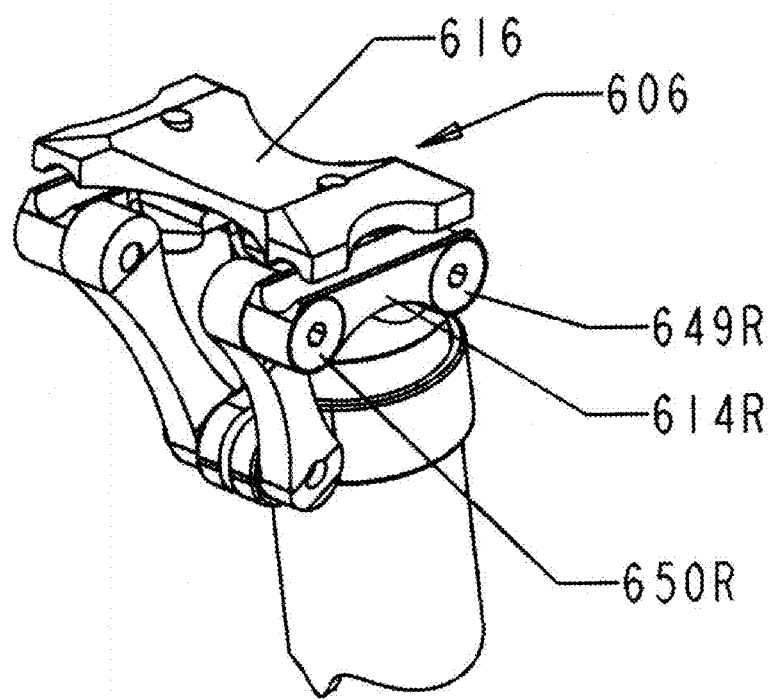
FIG. 31 is a top perspective view of the sixth embodiment.

A sixth and alternative embodiment of the present invention is shown in FIGS. 30-31. It is similar the third embodiment described in FIGS. 14-19 above and the description thereof will not be repeated. Only additional and modified components will be described in detail below. The number 600 has been added to reference numbers to indicate this sixth embodiment.

This sixth embodiment primarily demonstrates an alternative seat clamping scheme and a divided support link.

Referring now to FIGS. 30-31, quill link 605 has one additional component: a pivot attachment member 666. Clamp link 606 has two additional components: central threaded fasteners 674R and 674L. Additionally, it has a singular clamping member 616. Support link 607 has two components: two support arms 677R and 677L. Seat post 603 has no threaded holes.

Referring to FIG. 32-A and FIG. 32-B, pivot attachment member 666 has an inside surface 667, a boss 668, and two threaded holes 669R and 669L. Inside surface 667 is slightly larger than the outer surface of the seat post.

Seat rail supports 614R (FIGS. 34-A and 34-B) and 614L are modified and have an inside face 629, an outside face 630, a forward bore 631, a rearward bore 632, a longitudinal groove 634, a central bore 676, a clamping tab 679, and a clamping contact boss 680.

Clamping member 616 (FIG. 35) has two longitudinal grooves 642R and 642L, two central threaded holes 675R and 675L, and a bottom surface 681.

Support arms 677R (FIG. 35) and 677L (FIG. 36) each have a boss 663 and a threaded hole 647. Additionally, support arm 677R has a threaded hole 664 through boss 663, and support arm 677L has a bore 646 through boss 663.

Referring now to FIGS. 30-31, upper threaded fasteners 649R and 649L attach the clamp link to the quill link. Rear threaded fasteners 650R and 650L attach the clamp link to the support link at the threaded hole of the support arms. The central threaded fasteners pass through the central bore of the seat rail supports, and thread into the central threaded holes of the clamping member.

The seat rail supports in combination with the clamping member and the central threaded fasteners clamp the seat rails. The clamping contact boss of the seat rail supports contacts the bottom surface of the clamping member just after the central threaded fasteners begin to tighten. This contact prevents twisting of the clamping tabs of the seat rail supports towards the clamping member about the seat rails. To apply clamping pressure to the seat rails the clamping member is designed to flex slightly as the central threaded fasteners are tightened.

Operation—FIGS. 30-31—Sixth Embodiment

The operation of the sixth embodiment is identical to the fifth embodiment but is repeated below for clarity.

Horizontal position is adjusted by loosening the central threaded fasteners until the seat rails slide freely within the clamp link. When the desired position is obtained, the central threaded fasteners are tightened back up.

Angular position is adjusted independently by loosening the upper threaded fasteners, the rear threaded fasteners, and the lower threaded fastener until all pivots are free to rotate and the pivot adjustment collar is free to slide along the seat post. When the desired angular position is found the assembly is then tightened back up.

Description—FIGS. 37-43-B—Seventh Embodiment

Figure 37:
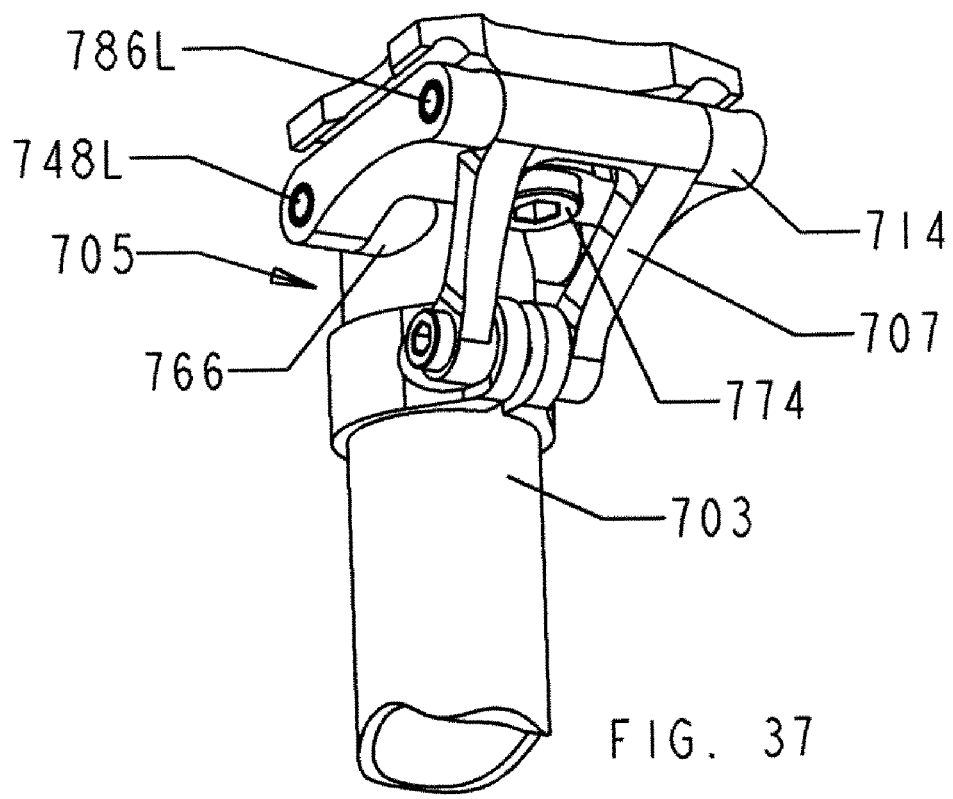
FIG. 37 is a bottom perspective view of the seventh embodiment.
Figure 38:
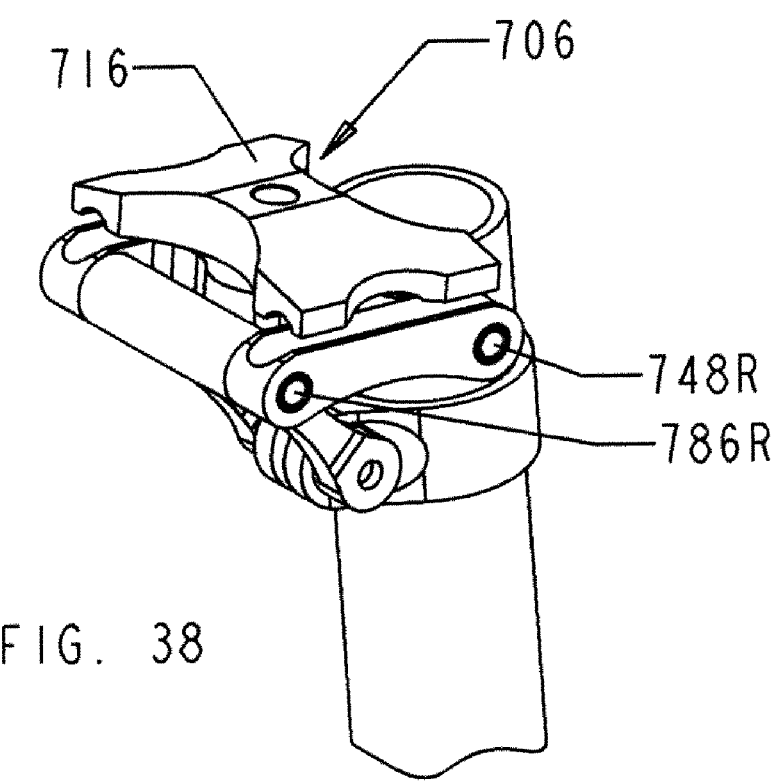
FIG. 38 is a top perspective view of the seventh embodiment.

A seventh and alternative embodiment of the present invention is shown in FIGS. 37-38. It is similar the third embodiment described in FIGS. 14-19 above and the description thereof will not be repeated. Only additional and modified components will be described in detail below. The number 700 has been added to reference numbers to indicate this seventh embodiment.

This seventh embodiment primarily demonstrates a simple independent adjustment scheme. It utilizes one threaded fastener for horizontal position adjustment and one threaded fastener for angular position adjustment.

Referring to FIGS. 37-38, quill link 705 has one additional component: a pivot attachment member 766. It has no pivot spacers. Clamp link 706 has one additional component: a central threaded fastener 774. It also includes a singular seat rail support 714 and a singular clamping member 716.

Seat post 703 (FIG. 39) has a precision bore 782 through its right and left sidewalls.

Pivot attachment member 766 (FIG. 40-A and FIG. 40-B) has an outside surface 783, and two pivot bores 784R and 784L. Pivot bores 784R and 784L locate the upper pivot axis. Outside surface 783 has a precisely cut diameter to allow for a press-fit attachment into precision bore 782 of the seat post. The diameter of pivot bores 784R and 784L are accurately cut to allow press-fit attachment of two upper pins 748R (FIG. 38) and 748L (FIG. 37).

Referring now to FIG. 41, seat rail support 714 has two precision forward bores 731R and 731L, two precision rearward bores 732R and 732L, a cross beam 785, a central bore 776, and two longitudinal grooves 734R and 734L. Forward bores 731R and 731L, and rearward bores 732R and 732L, are accurately cut to allow tight pivotal motion around the upper pins and two rear pins 786R (FIG. 38) and 786L (FIG. 37).

Clamping member 716 (FIG. 42) has two longitudinal grooves 742R and 742L, one central threaded hole 775, and four side cutouts 787a, 787b, 787c, and 787d. The cutouts all reduce weight. Additionally, cutout 787a provides clearance around the quill link.

Referring to FIGS. 43-A and 43-B, support link 707 has one cutout 745, a bore 746, two precision holes 788R and 788L, two bosses 772R and 772L, and a lower threaded hole 764. Precision holes 788R and 788L are cut accurately to allow press-fit attachment of the rear pins.

As shown in FIGS. 37-38, the upper pins attach the clamp link to the quill link. The rear pins attach the clamp link to the support link. The central threaded fastener passes through the central bore of the seat rail support and threads into the central threaded hole of the clamping member.

Operation—FIGS. 37-38—Seventh Embodiment

Horizontal position is adjusted by loosening the central threaded fastener until the seat rails slide freely within the clamp link. When the desired position is obtained, the central threaded fastener is tightened back up.

Angular position is adjusted independently by loosening the lower threaded fastener until the pivot adjustment collar is free to slide along the seat post. When the desired angular position is reached the lower threaded fastener is tightened back up.

Description—FIGS. 44-48-B—Eighth Embodiment

Figure 44:
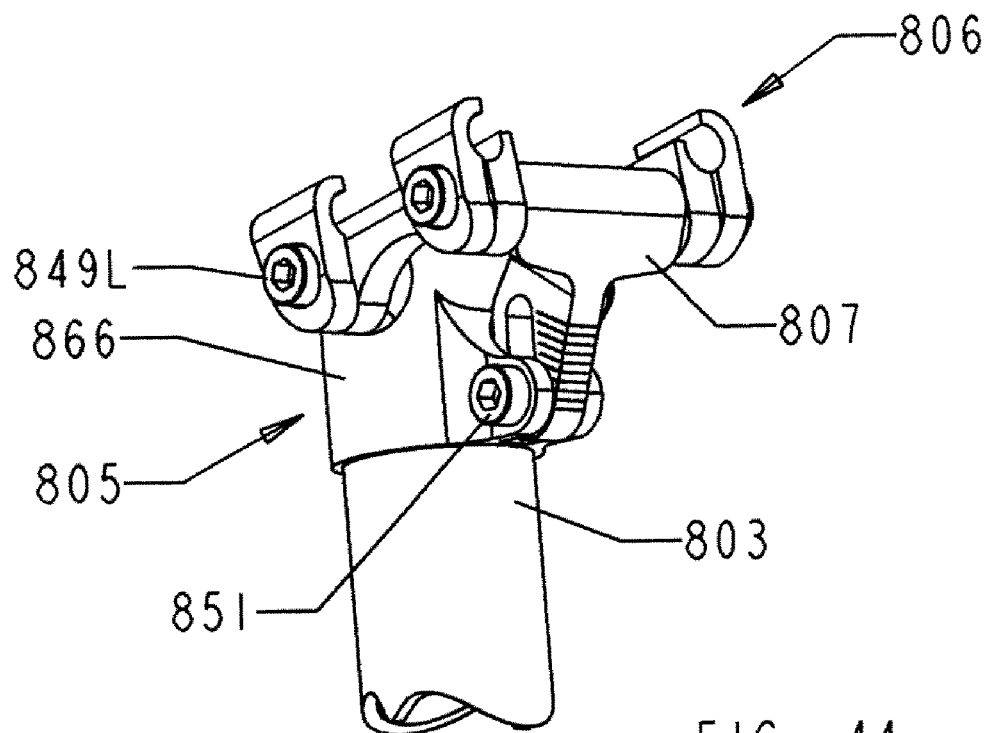
FIG. 44 is a bottom perspective view of the eighth embodiment.
Figure 45:
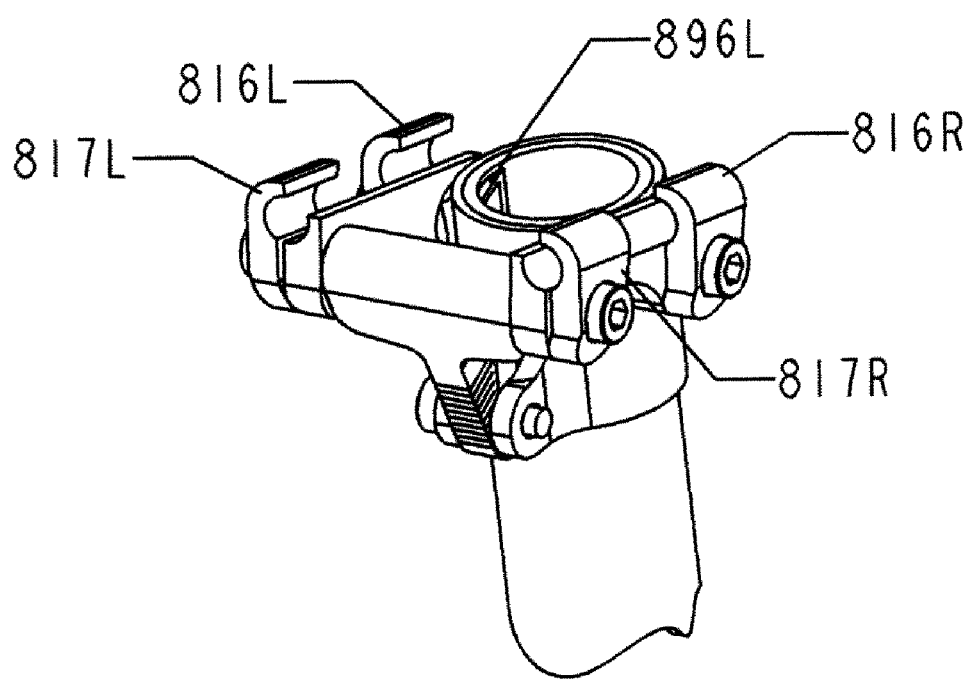
FIG. 45 is a top perspective view of the eighth embodiment.

An eighth and alternate embodiment of the present invention is shown in FIGS. 44-45. It is nearly identical to the first embodiment described in FIGS. 1-9 above and the description thereof will not be repeated. Only modified components will be described in detail below. The number 800 has been added to reference numbers to indicate parts of this eighth embodiment.

This eighth embodiment primarily demonstrates a novel and unique angular adjustment scheme and calibration scale.

Referring to FIGS. 44-45, quill link 805 has one additional component: a pivot attachment member 866. It has no pivot spacers. Clamp link 806 is modified in a similar manner to the second embodiment. The clamping members are divided into two pieces each creating two upper clamping members 816R and 816L, and two rear clamping members 817R and 817L.

Seat post 803 (FIG. 46) has no upper or lower threaded holes and has two upper bores 882R and 882L.

Referring now to FIG. 47, upper pivot spacers as described in the first embodiment are formed integrally into pivot attachment member 866 as bosses 812R and 812L. Additionally, the pivot attachment member has an inside surface 867, two pivot bores 884R and 884L, a lower pivot clamping boss 889, an indicating mark 890, a lower threaded hole 891, and a lower bore 893. Inside surface 867 is slightly larger in diameter than the outer surface of the seat post.

Referring to FIG. 48-A and FIG. 48-B, support link 807 has two threaded holes 847R and 847L, a lower pivot slot 894, and a calibration scale 895.

Referring now to FIGS. 44-45, the pivot attachment member is positioned over the upper portion of the seat post, lining up the right and left bores of the seat post and the right and left pivot bores of the pivot attachment member, and is bonded in place.

A t-nut type upper threaded insert 896L passes through left side bore of the seat post, through the pivot bore of the pivot attachment member, and into the forward bore of the left seat rail support. Upper threaded fastener 849L passes through the left upper clamping member and threads into the threaded insert. The right side is assembled in a similar manner.

Lower threaded fastener 851 passes through the lower bore of the pivot attachment member, through the lower pivot slot of the support link, and threads into the lower threaded hole of the pivot attachment member. When the lower threaded fastener is tightened, the support link is clamped in place at the quill link.

Operation—FIGS. 44-45—Eighth Embodiment

Horizontal seat position is adjusted similarly to the first embodiment and can be adjusted independently of angular position.

As in the first embodiment, angular seat position is adjusted by altering the distance between the rear pivot axis and the lower pivot axis. As this distance is increased the angular seat position will be tilted forward, and as it is decreased the angular seat position will be tilted rearward.

Angular seat position is adjusted independently by first slightly loosening the upper threaded fasteners, rear threaded fasteners, and greatly loosening the lower threaded fastener. This allows rotation about the upper pivot axis, the rear pivot axis, and the lower pivot axis. It also allows the support link to slide freely along the lower pivot slot within the lower pivot clamping boss of the pivot attachment member. When the desired angular position is reached the assembly is tightened back up. As the support link is slid in an upward direction the angular position is tilted forward, and as it is slid in a downward direction the angular position is tilted rearward.

Angular seat position is indicated by interpreting the relative position of the indicating mark of the pivot attachment member to the calibration scale of the support link.

It will be appreciated that this embodiment describes only one of many possible schemes for adjusting angular position by altering distance between the rear pivot axis and the lower pivot axis.

Figure 49:
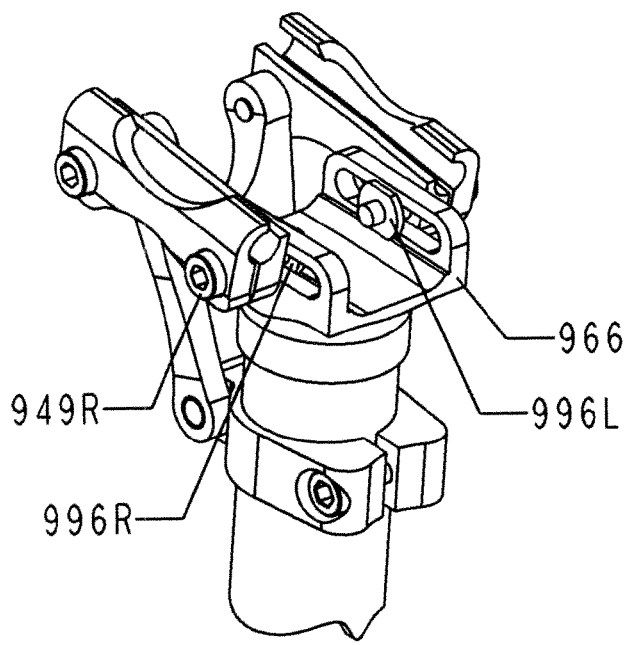
FIG. 49 is a top perspective view of the ninth embodiment.
Figure 50:
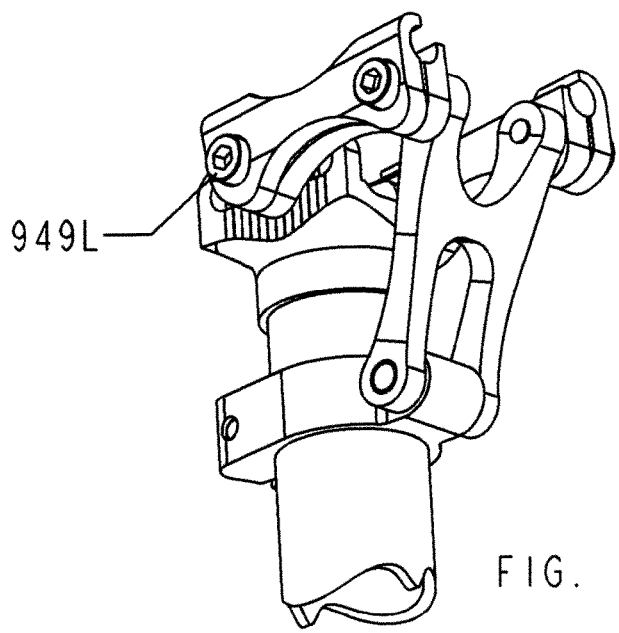
FIG. 50 is a bottom perspective view of the ninth embodiment.
Figure 51:
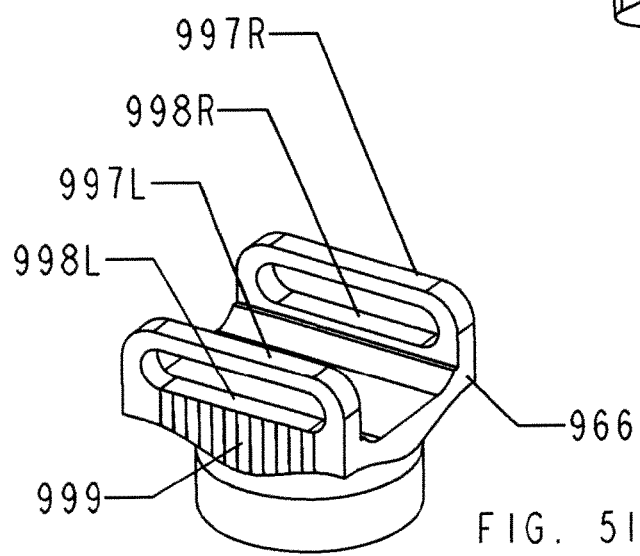
FIG. 51 is a top perspective view of a pivot attachment member.

Description—FIGS. 49-51—Ninth Embodiment

A ninth and alternative embodiment of the present invention is shown in FIGS. 40-50. It is nearly identical to the fourth embodiment described in FIGS. 20-25 above and the description thereof will not be repeated. Only additional and modified components will be described in detail below. The number 900 has been added to reference numbers to indicate this ninth embodiment.

This ninth embodiment primarily demonstrates the alteration of the position of more than one of the pivot axes within one seat clamping assembly. In this embodiment, the additional adjustment creates a novel and unique adjustable horizontal offset without altering the seat clamping area.

Referring to FIG. 51, pivot attachment member 966 has two bosses 997R and 997L, two upper pivot adjustment slots 998R and 998L, and a horizontal offset calibration scale 999. The upper pivot adjustment slots allow the location of the upper pivot axis to be adjusted horizontally.

Referring now to FIGS. 49-50, two t-nuts or upper threaded inserts 996R and 996L pass through the upper pivot adjustment slots of the pivot attachment member and into the forward bore of the right and left seat rail supports. Two upper threaded fasteners 949R and 949L pass through the forward bore of the right and left clamping members and thread into the right and left upper threaded inserts.

Operation—FIGS. 49-50—Ninth Embodiment

Horizontal position and angular position are adjusted in a similar manner to the fourth embodiment.

Horizontal offset is adjusted by shifting the upper pivot axis forward and rearward.

Horizontal offset is adjusted by loosening the upper threaded fasteners and the rear threaded fasteners. The location of the upper pivot axis is then slid forward or backward along the upper pivot adjustment slots to the desired position. The assembly is then tightened back up. This is also an alternative method of angular position adjustment.

Horizontal offset is indicated by interpreting the relative position of the left side upper threaded fastener to the horizontal offset calibration scale of the pivot attachment member.

It will be appreciated that this embodiment describes only one of many possible combinations of altering the distances between the upper pivot axis, rear pivot axis, and lower pivot axis. All three of these distances can be altered independently or simultaneously within any one seat clamping assembly.

It will also be appreciated that the calibration scale described above is only one example of many possible calibration scale schemes for indicating the horizontal offset.

Additional Embodiments—FIGS. 52-55

Figure 52:
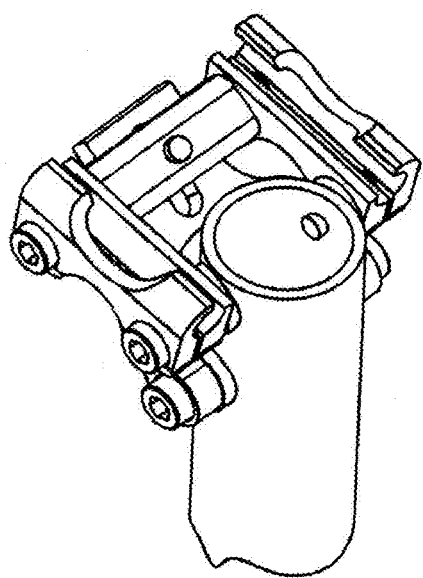
FIG. 52 is a top perspective view of an alternate embodiment utilizing an adjustable support link assembly.
Figure 53:
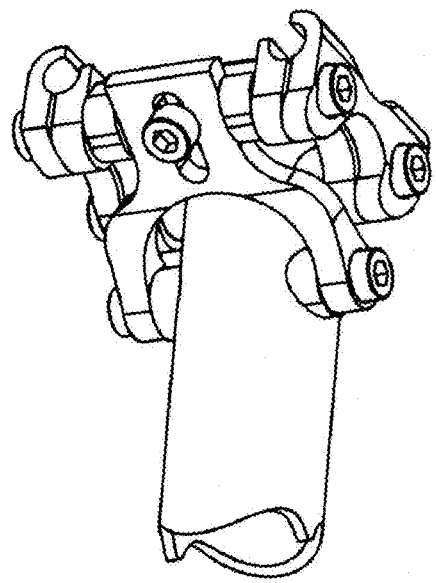
FIG. 53 is a bottom perspective view of an alternate embodiment utilizing an adjustable support link assembly.

An additional embodiment is shown in FIGS. 52 and 53. This embodiment demonstrates an alternate adjustment scheme between the rear axis and the lower axis. This embodiment uses an adjustable support link assembly.

Figure 54:
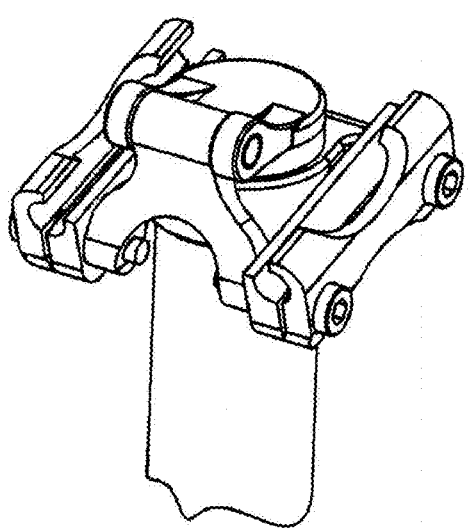
FIG. 54 is top perspective view of an alternate embodiment utilizing an alternate link arrangement.
Figure 55:
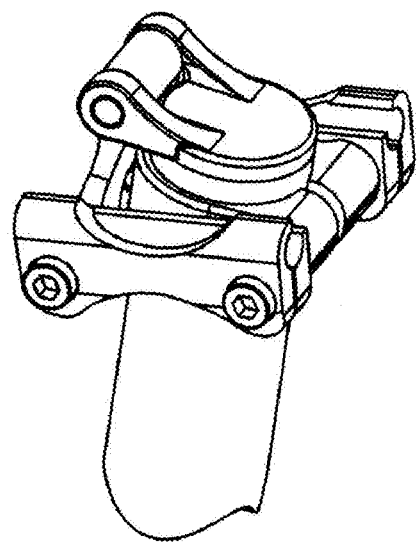
FIG. 55 is top perspective view of an alternate embodiment utilizing an alternate link arrangement.

Another additional embodiment is shown in FIGS. 54 and 55. It demonstrates an alternative link arrangement. In this embodiment, the positions of the clamp link and the support link are exchanged. This embodiment also demonstrates an inserted pivot attachment member and an adjustment collar.

CONCLUSION, RAMIFICATIONS, AND SCOPE OF INVENTION

Thus the reader will see that the present invention provides a lightweight, easily adjustable seat clamping assembly where angular and horizontal positions are adjusted both independently and/or simultaneously. It uses a three-link structure to reduce bending loads in its members and to efficiently reduce weight. It provides novel and unique angular adjustment schemes never seen in the industry. It also provides novel calibration scales and horizontal offset adjustments unique to the industry.

While the above descriptions contain many specificities, these should not be construed as limitations on the scope of the invention, but rather as an exemplification of certain embodiments. Many other variations are possible. These include but should not be limited to combinations of components of the embodiments described above, different materials of construction, alternate manufacturing techniques, alternate assembly configurations, and different attachment techniques.

What is claimed is:

1. Three link cycle seat clamp apparatus for mounting a cycle seat having an attached seat mounting rail extending below a lower portion of the cycle seat and a seat post attachable to a bicycle adjacent a lower end of the cycle post and constructed to receive the cycle seat at an upper end thereof, the apparatus comprising:

a clamp link having a first pivot point and a spaced apart second pivot point, the clamp link being designed to adjustably clamp to the seat mounting rail;

a support link having a first pivot point and a second pivot point;

the first pivot point of the clamp link being pivotally attachable to the seat post at one of, a point adjacent the upper end of the seat post, and a point spaced from the upper end of the seat post, to define a first pivot axis;

the first pivot point of the support link being pivotally attached to the second pivot point of the clamp link to define an intermediate pivot axis; and the second pivot point of the support link being pivotally attachable to the seat post at the other one of, a point adjacent the upper end of the seat post, and a point spaced from the upper end of the seat post, to define a second pivot axis;

the first pivot axis and the intermediate pivot axis defining a first distance therebetween, the intermediate pivot axis and the second pivot axis defining a second distance therebetween, and the second pivot axis and the first pivot axis defining a third distance therebetween, and at least one of the first distance, the second distance and the third distance being adjustable to change the orientation of the seat relative to a horizontal orientation.

2. Three link cycle seat clamp apparatus as claimed in claim 1 wherein the second pivot point of the support link is pivotally attachable at the point spaced from the upper end of the seat post, and includes a pivot adjustment collar designed to coaxially encircle the seat post, the pivot adjustment collar including a clamping mechanism having a released orientation in which the pivot adjustment collar is longitudinally slideable along the seat post and a clamped orientation in which the pivot adjustment collar is clamped to the seat post.

3. Three link cycle seat clamp apparatus as claimed in claim 2 wherein the seat has two attached seat mounting rails, and the clamp link includes two horizontally spaced apart seat rail supports designed to be positioned on opposite sides of the seat post and to each extend between the upper pivot point and the intermediate pivot point, two clamping members one each associated with each seat rail support, and two releasable fasteners one each associated with each seat rail support and each fastener having a released orientation and a locked orientation, the fasteners attaching each of the clamping members to the associated seat rail support, whereby each of the seat rails is slideable horizontally between a seat rail support and an associated clamping member in the released orientation and prevented from horizontal movement in the locked orientation.

4. Three link cycle seat clamp apparatus as claimed in claim 3 wherein the support link is generally U-shaped with the first pivot point including two spaced apart ends one each pivotally coupled to one each of the two spaced apart seat rail supports, and the second pivot point including two spaced apart opposed ends attached to the clamping mechanism and pivotable in the released orientation.

5. Three link cycle seat clamp apparatus as claimed in claim 1 wherein the third distance between the second pivot axis and the first pivot axis is adjustable by sliding a pivot adjustment collar longitudinally along the seat post and the first pivot point and the intermediate pivot point are continuously in a pivotal orientation.

6. Three link cycle seat clamp apparatus as claimed in claim 1 wherein the first pivot point of the clamp link is pivotally attachable to the seat post by a pivot adjustment collar designed to coaxially encircle the seat post adjacent the upper end, the pivot adjustment collar including a pivot mechanism attached to the first pivot point of the clamp link.

7. Three link cycle seat clamp apparatus as claimed in claim 1 including a pivot attachment member designed to coaxially encircle the seat post and positionable coaxially over the upper end of the seat post, the first pivot point of the clamp link being pivotally attached to the pivot attachment member to define the first pivot axis.

8. Three link cycle seat clamp apparatus as claimed in claim 7 wherein the pivot attachment member includes at least one horizontal pivot adjustment slot, the first pivot point of the clamp link being pivotally attached in the pivot adjustment slot to provide adjustment of the first distance.

9. Three link cycle seat clamp apparatus as claimed in claim 1 wherein one of the first pivot point and the second pivot point of the support link has a longitudinally extending pivot adjustment mechanism designed and positioned to provide an adjustment for the second distance.

10. Three link cycle seat clamp apparatus for mounting a cycle seat having attached seat mounting rails extending below a lower portion of the cycle seat, the apparatus comprising:
  a quill link or seat post attachable to a bicycle adjacent a lower end thereof and constructed to receive the seat at an upper end thereof;
  a clamp link having a first pivot point and a spaced apart second pivot point and designed to adjustably clamp to the seat mounting rails;
  a support link having a first pivot point and a second pivot point;
  the first pivot point of the clamp link being pivotally attached to the quill link to define a first pivot axis;
  the first pivot point of the support link being pivotally attached to the second pivot point of the clamp link to define an intermediate pivot axis; and
  the second pivot point of the support link being pivotally attached to the quill link at a point spaced from the first pivot point of the clamp link to define a second pivot axis;
  the first pivot axis and the intermediate pivot axis defining a first distance therebetween, the intermediate pivot axis and the second pivot axis defining a second distance therebetween, and the second pivot axis and the first pivot axis defining a third distance therebetween, and at least one of the first distance, the second distance and the third distance being adjustable to change the orientation of the seat relative to a horizontal orientation.

11. A three link cycle seat clamp apparatus as claimed in claim 10 wherein the first pivot point of the clamp link is pivotally attached to the quill link at a point spaced from the upper end of the quill link, and the second pivot point of the support link is pivotally attached to the quill link adjacent the upper end of the quill link.

12. Three link cycle seat clamp apparatus for mounting a cycle seat having attached seat mounting rails extending below a lower portion of the cycle seat, the apparatus comprising:
  a quill link or seat post attachable to a bicycle adjacent a lower end thereof and constructed to receive the seat at an upper end thereof;
  a clamp link having a first pivot point and a spaced apart second pivot point and designed to adjustably clamp to the seat mounting rails;
  a support link having a first pivot point and a second pivot point, the second pivot point of the support link including a pivot adjustment collar designed to coaxially encircle the quill link, the pivot adjustment collar including a clamping mechanism having a released orientation in which the pivot adjustment collar is longitudinally slideable along the quill link and a clamped orientation in which the pivot adjustment collar is clamped to the quill link;
  the first pivot point of the clamp link being pivotally attached to the quill link adjacent the upper end of the quill link to define an upper pivot axis;
  the first pivot point of the support link being pivotally attached to the second pivot point of the clamp link to define an intermediate pivot axis; and
  the second pivot point of the support link being pivotally attached to the quill link by the pivot adjustment collar at a point spaced from the upper end of the quill link to define a lower pivot axis;
  the upper pivot axis and the intermediate pivot axis defining a first distance therebetween, the intermediate pivot axis and the lower pivot axis defining a second distance therebetween, and the lower pivot axis and the upper pivot axis defining a third distance therebetween, and at least the third distance being adjustable to change the orientation of the seat relative to a horizontal orientation.

13. Three link cycle seat clamp apparatus as claimed in claim 12 wherein the clamp link includes two horizontally spaced apart seat rail supports designed to be positioned on opposite sides of the quill link and to each extend substantially between the upper pivot point and the intermediate pivot point, two clamping members one each associated with each seat rail support, and two releasable fasteners one each associated with each seat rail support and each fastener having a released orientation and a locked orientation, the fasteners attaching each of the clamping members to the associated seat rail support, whereby each of the seat rails is slideable horizontally between a seat rail support and an associated clamping member in the released orientation and prevented from horizontal movement in the locked orientation.

14. Three link cycle seat clamp apparatus as claimed in claim 13 wherein the support link is generally U-shaped with the first pivot point including two spaced apart ends one each pivotally coupled to one each of the two spaced apart seat rail supports, and the second pivot point including two spaced apart opposed ends attached to the clamping mechanism and pivotable in the released orientation.

15. Three link cycle seat clamp apparatus as claimed in claim 12 wherein the upper pivot point and the intermediate pivot point are continuously in a pivotal orientation.

* * * * *